(12) United States Patent
Ell

(10) Patent No.: US 10,955,261 B2
(45) Date of Patent: Mar. 23, 2021

(54) AIR DATA ATTITUDE REFERENCE SYSTEM

(71) Applicant: Rosemount Aerospace Inc., Burnsville, MN (US)

(72) Inventor: Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 832 days.

(21) Appl. No.: 15/489,148

(22) Filed: Apr. 17, 2017

(65) Prior Publication Data

US 2018/0299293 A1 Oct. 18, 2018

(51) Int. Cl.
*G01C 23/00* (2006.01)
*G01C 25/00* (2006.01)
*G01C 21/16* (2006.01)

(52) U.S. Cl.
CPC ............ *G01C 23/00* (2013.01); *G01C 21/16* (2013.01); *G01C 25/00* (2013.01)

(58) Field of Classification Search
CPC ........ G01C 21/16; G01C 23/00; G01C 25/00; G01P 3/62; G05D 1/0607
See application file for complete search history.

(56) References Cited

U.S. PATENT DOCUMENTS

| | | | |
|---|---|---|---|
| 4,914,598 A | 4/1990 | Krogmann et al. | |
| 5,841,537 A | 11/1998 | Doty | |
| 7,006,032 B2 * | 2/2006 | King | G08G 5/0008 342/29 |
| 7,107,833 B2 | 9/2006 | Osborne | |
| 7,418,364 B1 | 8/2008 | Horton et al. | |
| 8,020,442 B2 | 9/2011 | Ell et al. | |
| 8,082,099 B2 | 12/2011 | Latif | |
| 8,229,606 B2 | 7/2012 | Vos et al. | |
| 8,442,703 B2 | 5/2013 | Petillon | |
| 8,887,566 B1 | 11/2014 | Tanenhaus | |
| 9,435,661 B2 | 9/2016 | Brenner et al. | |

(Continued)

FOREIGN PATENT DOCUMENTS

EP 2023083 A2 2/2009

OTHER PUBLICATIONS

Hung, J.C. et al., Size effect on Navigation using a Strapdown IMU. No. DRSMIT-79-73. Army Missile Command Redstone Arsenal AL Technology Lab, 1979, 29 pages.

(Continued)

*Primary Examiner* — Elias Desta
(74) *Attorney, Agent, or Firm* — Kinney & Lange, P.A.

(57) ABSTRACT

An air data computer senses acceleration and rotational rate of an aircraft with an inertial sensor assembly of the air data computer. The air data computer determines first attitude information of the aircraft based on the acceleration and rotational rate sensed with the inertial sensor assembly. The air data computer receives second attitude information of the aircraft from a source external to the air data computer, and determines attitude correction values based on the first attitude information and the second attitude information. The air data computer applies the attitude correction values to the first attitude information to produce error-corrected attitude information that is output from the air data computer.

16 Claims, 7 Drawing Sheets

(56) References Cited

U.S. PATENT DOCUMENTS

2001/0020214 A1\* 9/2001 Brenner ................. G01S 19/07
  701/470
2016/0223683 A1   8/2016 Boyarski
2016/0320190 A1  11/2016 Wu et al.

OTHER PUBLICATIONS

Sayed Talebi, A Distributed Quatemion Kalman Filter with Applications to Fly-by-Wire Systems, ArXiv: 1605.05588v1, May 15, 2016, 5 pages.
Extended European Search Report for European Patent Application No. 18167272.6, dated Dec. 18, 2018, 14 pages.
Partial European Search Report for EP Application No. 18167272.6, dated Sep. 12, 2018, 15 Pages.

\* cited by examiner

AIR DATA ATTITUDE REFERENCE SYSTEM

BACKGROUND

This disclosure relates generally to air data systems, and more particularly to air data systems that utilize inertial sensors to produce aircraft attitude information.

Modern aircraft often incorporate air data systems that calculate air data outputs based on measured parameters collected from various sensors positioned about the aircraft. For instance, many air data systems utilize air data probes that measure pneumatic pressure of airflow about the aircraft exterior to generate aircraft air data outputs, such as angle of attack, calibrated airspeed, Mach number, altitude, altitude rate (i.e., aircraft vertical speed), or other air data parameters. Such air data parameters are then output to consuming systems, such as aircraft flight management systems, flight control systems, stall protection systems, and other consuming systems that utilize the air data parameters for operational control of the aircraft.

Often, aircraft also include an attitude reference system (ARS) that provides attitude information in the form of aircraft pitch and roll angles. The ARS typically includes an inertial measurement unit that senses current acceleration forces experienced by the IMU as well as changes in rotational position. Outputs of the IMU are often integrated over time by the ARS to arrive at an orientation (i.e., attitude) of the aircraft. However, such integration techniques can compound sensor errors over time. Some sensor errors, such as those due to temperature, can be considered deterministic in nature, and therefore compensated for in the integration techniques via pre-defined compensation factors. Other errors, such as turn-on to turn-on biases and scale factor errors can be unpredictable or stochastic in nature, thereby preventing use of such pre-defined correction factors for effective error compensation operations.

SUMMARY

In one example, a system includes a first air data computer that includes a first inertial sensor assembly. The first air data computer is configured to sense, with the first inertial sensor assembly, acceleration and rotational rate of an aircraft, and to determine first attitude information of the aircraft based on the acceleration and rotational rate sensed with the first inertial sensor assembly. The first air data computer is further configured to receive second attitude information of the aircraft from a source external to the first air data computer, and to determine first attitude correction values based on the first attitude information and the second attitude information. The first air data computer is further configured to apply the first attitude correction values to the first attitude information to produce first error-corrected attitude information of the aircraft, and to output the first error-corrected attitude information.

In another example, an air data computer includes an inertial sensor assembly, a Kalman estimator module, and an attitude determination module. The inertial sensor assembly includes a plurality of accelerometers and a plurality of rate gyroscopes. Each of the plurality of accelerometers is configured to sense acceleration along one of a plurality of axes. Each of the plurality of rate gyroscopes is configured to sense rotational rate along one of the plurality of axes. The Kalman estimator module is configured to determine a set of attitude correction values based on attitude information of the aircraft received from a source external to the air data computer. The attitude determination module is configured to determine error-corrected attitude information using the set of attitude correction values, and to output the error-corrected attitude information.

In another example, a method includes sensing acceleration and rotational rate of an aircraft with an inertial sensor assembly of an air data computer, and determining first attitude of the aircraft based on the acceleration and rotational rate sensed with the inertial sensor assembly. The method further includes receiving second attitude information of the aircraft from a source external to the air data computer, and determining attitude correction values based on the first attitude information and the second attitude information. The method further includes applying the attitude correction values to the first attitude information to produce error-corrected attitude information of the aircraft, and outputting the error-corrected attitude information from the air data computer.

DETAILED DESCRIPTION

As described herein, a system implementing techniques of this disclosure includes at least one air data computer that includes an inertial sensor assembly having a plurality of accelerometers and a plurality of rate gyroscopes. The air data computer outputs attitude information in the form of aircraft pitch and roll for use by consuming systems (e.g., an inertial navigation system, an aircraft flight control system, or other consuming systems) for operational control of the aircraft. Attitude information received from an external source (e.g., a second air data computer having a second inertial sensor assembly), as well as pressure-based air data parameters (e.g., true airspeed and angle of attack) determined by the air data computer are utilized to determine attitude correction values as well as to estimate bias and/or scale factor errors of the accelerometer and rate gyroscope outputs. The air data computer applies the attitude correction values to determined attitude information to produce error-corrected attitude information that is output to consuming systems. In addition, the air data computer removes the estimated bias and/or scale factor errors from the sensed acceleration and angular rate parameters to produce error-corrected output values. Such error-corrected values are further utilized for subsequent attitude estimations, thereby increasing an accuracy of the acceleration and angular rate outputs as well as the aircraft attitude outputs to consuming systems.

Moreover, an air data computer implementing techniques of this disclosure utilizes acceleration sensed by the inertial sensor assembly and acceleration received from the external source to derive an angular acceleration of the aircraft that is blended with angular rate sensed by the inertial sensor assembly to reduce the effect of sensed centripetal and tangential accelerations. The blended angular rate, rather than the angular rate sensed directly by the inertial sensor assembly, is utilized for attitude determinations, thereby increasing an accuracy of the attitude outputs as well as the bias and/or scale factor error corrections that are applied to the accelerometer and rate gyroscope outputs. Example systems that include three or more air data computers, each having an inertial sensor assembly, enable comparison of the attitude outputs of each to provide validity status determinations, fault isolation, and input selection that facilitates graceful degradation of the system. Accordingly, a system implementing techniques of this disclosure utilizes attitude information from multiple sources to increase overall system reliability as well as an accuracy of attitude, acceleration, and angular rate outputs.

Figure 1:
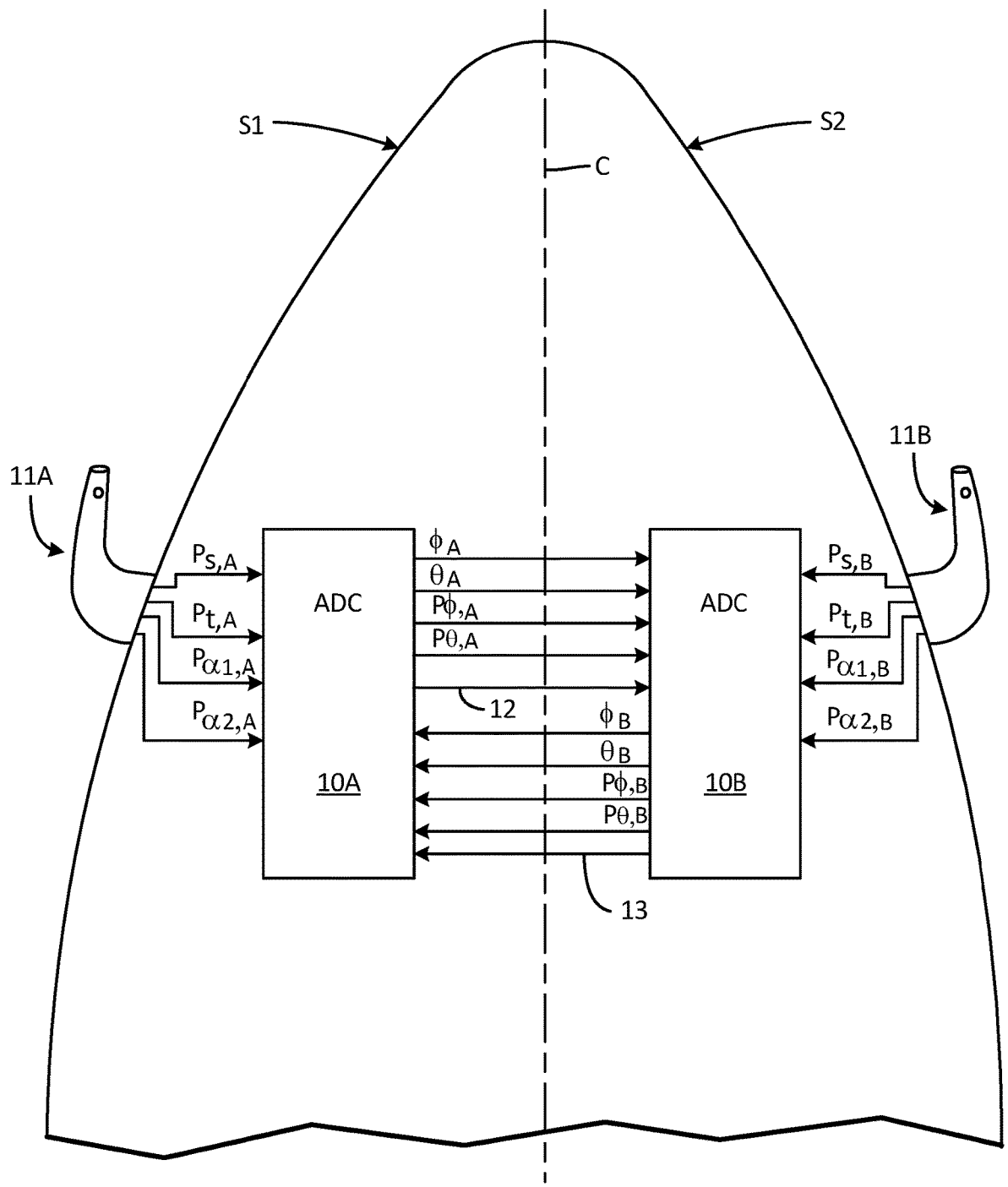
FIG. 1 is a schematic block diagram illustrating an example system that includes two aircraft air data computers that exchange attitude and acceleration information to produce error-corrected attitude information of the aircraft.

FIG. 1 is a schematic block diagram illustrating an example system that includes air data computers 10A and 10B that exchange attitude and acceleration information to produce error-corrected attitude information of the aircraft. As illustrated in FIG. 1, the example system further includes pitot-static probes 11A and 11B. Pitot-static probe 11A is electrically, pneumatically, and/or communicatively coupled with air data computer (ADC) 10A. Pitot-static probe 11B is electrically, pneumatically, and or communicatively coupled with air data computer 10B.

Each of pitot-static probe 11A and 11B are configured to be mounted to an exterior of the aircraft and have a plurality of pressure ports and corresponding pressure sensors configured to sense pressure of an oncoming airflow about the aircraft exterior. For instance, as illustrated in FIG. 1, pitot-static probe 11A includes a total pressure sensing port, a static pressure sensing port, and two alpha pressure sensing ports, each pneumatically connected to one or more pressure sensors for measuring static pressure $P_{S,A}$, total pressure $P_{t,A}$, first alpha pressure $P_{\alpha 1,A}$, and second alpha pressure $P_{\alpha 1,A}$ that are provided to air data computer 10A as inputs. Pitot-static probe 11B also includes a total pressure sensing port, a static pressure sensing port, and two alpha pressure sensing ports, each pneumatically connected to one or more pressure sensors for measuring static pressure $P_{S,B}$, total pressure $P_{t,B}$, first alpha pressure $P_{\alpha 1,B}$, and second alpha pressure $P_{\alpha 2,B}$ that are provided to air data computer 10B as inputs. In some examples, air data computer 10A is directly connected to pitot-static probe 11A, such that pitot-static probe 11A extends from an exterior of the aircraft into the oncoming airflow and air data computer 10A extends from pitot-static probe 11A within an interior of the aircraft. Similarly, air data computer 10B can be directly connected to pitot-static probe 11B, such that pitot-static probe 11B extends from the exterior of the aircraft into the oncoming airflow and air data computer 10B extends from pitot-static probe 11B within the interior of the aircraft.

As illustrated in FIG. 1, pitot-static probe 11A and air data computer 10A are disposed at first side S1 of the aircraft. Pitot-static probe 11B and air data computer 10B are disposed at second side S2 of the aircraft. First side S1 and second side S2 are separated by centerline C that extends through a central axis from a nose to a tail of the aircraft. In other examples, each of pitot-static probe 11A, air data computer 10A, pitot-static probe 11B, and air data computer 10B can be disposed at a same side of the aircraft.

Air data computer 10A and air data computer 10B are communicatively coupled via a communications data bus or other communicative connection to exchange data, such as attitude data, acceleration data, or other data. Examples of communications data buses include, e.g., an Aeronautical Radio, Incorporated (ARINC) 429 data bus, a Controller Area Network (CAN) bus, or other communications data bus.

Air data computer 10A and air data computer 10B are communicatively coupled to exchange attitude and acceleration information, though in some examples, air data computer 10A and air data computer 10B can exchange additional information, such as air data parameter information (e.g., true airspeed, altitude, angle of attack, or other air data parameter information), angular rate information, or other information.

As illustrated in FIG. 1, air data computer 10A outputs attitude information to air data computer 10B in the form of aircraft roll angle $\phi_A$, aircraft pitch angle $\theta_A$, roll angle error covariance $P_{\phi,A}$ representing an estimated covariance of an error of roll angle $\phi_A$, and pitch angle error covariance $P_{\theta,A}$ representing an estimated covariance of an error of pitch angle $\theta_A$. In addition, air data computer 10A outputs error-corrected body-axis accelerations 12 to air data computer 10B. Error-corrected body-axis accelerations 12 are error-corrected body-axis accelerations (e.g., a three-element vector of accelerations) corresponding to acceleration sensed by accelerometers (e.g., a triad of accelerometers) of an inertial sensor assembly of air data computer 10A, as is further described below. As further illustrated, air data computer 10A receives attitude information from air data computer 10B in the form of aircraft roll angle $\phi^B$, aircraft pitch angle $\theta_B$, roll angle error covariance $P_{\phi,B}$ representing an estimated covariance of an error of roll angle $\phi_B$, and pitch angle error covariance $P_{\theta,B}$ representing an estimated covariance of an error of pitch angle $\theta_B$. In addition, air data computer 10A receives error-corrected body-axis accelerations 13 from air data computer 10B including error-corrected accelerations (e.g., a three-element vector of accelerations) corresponding to acceleration sensed by accelerometers (e.g., a triad of accelerometers) of an inertial sensor assembly of air data computer 10B.

As is further described below, air data computer 10A determines air data parameters, such as aircraft angle of attack and aircraft true airspeed using measured static pressure $P_{S,A}$, total pressure $P_{t,A}$, first alpha pressure $P_{\alpha 1,A}$, and second alpha pressure $P_{\alpha 1,A}$ received from pitot-static probe 11A. Air data computer 10A determines aircraft attitude information (e.g., aircraft pitch and roll angles) based on error-corrected body-axis accelerations 12 and a blended angular rate that is determined based on error-corrected body-axis accelerations 12, error-corrected body-axis accelerations 13, and angular rates sensed by the inertial sensor assembly of air data computer 10A. Air data computer 10A utilizes the aircraft air data parameters (e.g., aircraft angle of attack and/or aircraft true airspeed) determined based on measured static pressure $P_{s,A}$, measured total pressure $P_{t,A}$, measured first alpha pressure $P_{\alpha1,A}$, and measured second alpha pressure $P_{\alpha1,A}$, as well as aircraft roll angle $\phi_B$, aircraft pitch angle $\theta_B$, roll angle error covariance $P_{\phi,B}$, and pitch angle error covariance $P_{\theta,B}$ to determine a set of bias and/or scale factor error correction values that are applied to accelerations and angular rates sensed by the inertial sensor assembly of air data computer 10A to produce error-corrected body-axis accelerations 12 and error-corrected body axis angular rates that are output by air data computer 10A to consuming systems for operational control of the aircraft.

Accordingly, rather than utilize only the accelerations and angular rates sensed by the inertial sensor assembly of air data computer 10A, attitude information and accelerations sensed by air data computer 10B are also utilized by air data computer 10A to generate the error-corrected body-axis accelerations and angular rates as well as the attitude information (e.g., aircraft roll angle $\phi_A$ and aircraft pitch angle $\theta_A$) that are output to consuming systems, thereby increasing an accuracy of the output values. Air data computer 10B performs similar operations to generate error-corrected body-axis accelerations 13, error-corrected body-axis angular rates, and attitude information in the form of aircraft roll angle 4, aircraft pitch angle $\theta_B$, roll angle error covariance $P_{\phi,B}$, and pitch angle error covariance $P_{\theta,B}$. Accordingly, air data computer 10A and air data computer 10B form a system of air data computers having inertial sensor assemblies that distributes functionality of an attitude reference system between them to provide multiple (e.g., redundant) aircraft attitude, body-axis acceleration, and body-axis angular rate outputs.

While the example of FIG. 1 has been illustrated and described with respect to two air data computers 10A and 10B, aspects of this disclosure are not so limited. For instance, in some examples, air data computers 10A and 10B need not exchange attitude information, but rather may receive attitude information from any external source (i.e., external to the respective air data computer) that determines aircraft attitude and acceleration information, such as an attitude reference system (ARS) or attitude and heading reference system (AHRS) of the aircraft. In some examples, rather than include both air data computer 10A and air data computer 10B, the system may include only one of air data computers 10A and 10B. In such examples, attitude and acceleration information can be received by the air data computer from an external source, such as an external ARS or AHRS. In yet other examples, the system can include more than two air data computers, such as three, four, or more air data computers, each having an inertial sensor assembly that senses acceleration and angular rate. In such examples, the air data computers can be interconnected via an aircraft data bus or other communicative connections to exchange attitude and acceleration information between the separate air data computers that is utilized for generating error-corrected accelerations, angular rates, and attitude information that is output to consuming systems.

In general, as the number of sources of attitude and acceleration information increases, an accuracy of the acceleration, angular rate, and attitude outputs of each of the air data computers increases. Moreover, in examples that include three or more separate sources of acceleration and attitude information (e.g., three or more air data computers having inertial sensor assemblies), each of the air data computers can separately compare the generated and received attitude and acceleration information for validity status determinations, failure identification, and input selection. For instance, in examples where attitude and/or acceleration information from two of the air data computers agrees (e.g., a difference being within a threshold tolerance), but attitude and/or acceleration from a third air data computer disagrees (e.g., the difference being greater than the threshold tolerance), the third air data computer and/or the received attitude and acceleration information from the third air data computer can be identified as associated with a failure mode and, in certain examples, reported to a central maintenance computer (CMC), data concentrator unit (DCU), electronic flight instrument system (EFIS), or other aircraft system. In such an example, each of the two air data computers having attitude and acceleration information that agrees can reject the failed information and utilize only the agreeing information for attitude and error-correction operations, thereby increasing overall reliability and accuracy of the system.

As such, techniques of this disclosure can increase accuracy of aircraft attitude outputs (e.g., aircraft pitch and roll), as well as body-axis acceleration and body-axis angular rate outputs that are utilized by consuming systems for operational control of the aircraft. The techniques can further enable fault identification and graceful degradation of the system, thereby increasing overall system reliability.

The examples of FIGS. 2-7 are described below within the context of air data computer 10A. However, it should be understood that the examples described below are also applicable to air data computer 10B (or any one or more additional air data computers included in the system).

Figure 2:
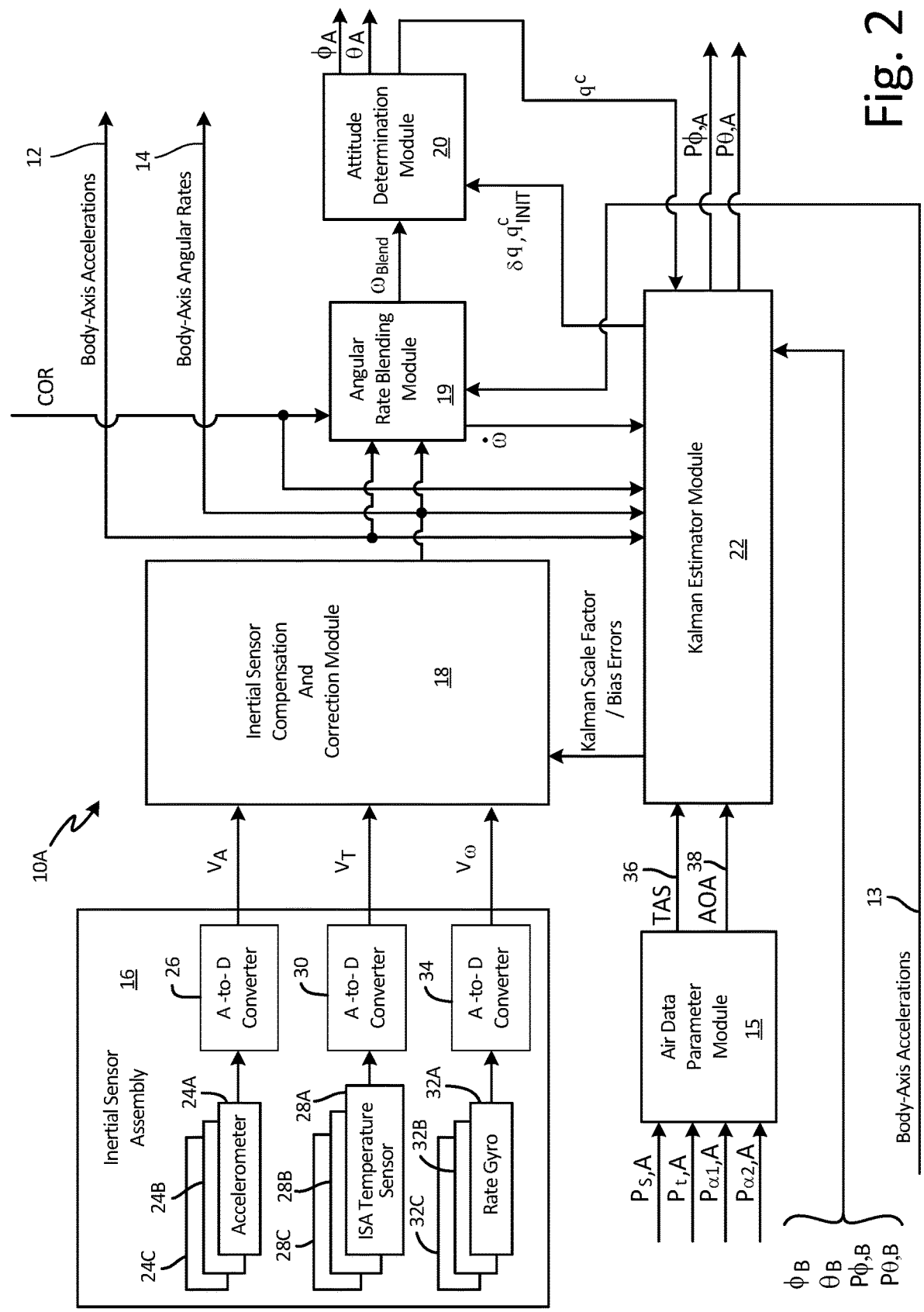
FIG. 2 is a schematic block diagram illustrating an example of one of the air data computers of FIG. 1 that utilizes received attitude and acceleration information to produce error-corrected attitude information of the aircraft.

FIG. 2 is a schematic block diagram illustrating an example of air data computer 10A that utilizes received attitude and acceleration information to produce error-corrected attitude information including aircraft roll angle $\phi_A$ and aircraft pitch angle $\theta_A$, as well as error-corrected body-axis accelerations 12 and error-corrected body-axis angular rates 14.

As illustrated in FIG. 2, air data computer 10A includes air data parameter module 15, inertial sensor assembly 16, inertial sensor compensation and correction module 18, angular rate blending module 19, attitude determination module 20, and Kalman estimator module 22. Inertial sensor assembly 16 includes accelerometers 24A, 24B, and 24C, analog-to-digital converter 26, temperature sensors 28A, 28B, and 28C, analog-to-digital converter 30, rate gyroscopes 32A, 32B, and 32C, and analog-to-digital converter 34.

As illustrated, air data computer 10A receives measured static pressure $P_{s,A}$, measured total pressure $P_{t,A}$, measured alpha pressure $P_{\alpha1,A}$, and measured alpha pressure $P_{\alpha2,A}$ as inputs from pitot-static probe 11A (FIG. 1). Air data parameter module 15 utilizes measured pressures $P_{s,A}$, $P_{t,A}$, $P_{\alpha1,A}$, and $P_{\alpha2,A}$ to determine pneumatic-based air data parameters, including true airspeed (TAS) 36, and angle of attack (AOA) 38, as is generally known in the art.

Accelerometers 24A, 24B, and 24C of inertial sensor assembly 16 form a 3-axis triad of accelerometers, each mounted (e.g., on a circuit board) and aligned to sense acceleration forces along one of three mutually-orthogonal axes. Rate gyroscopes 32A, 32B, and 32C are similarly mounted (e.g., on the same circuit board) and aligned to sense a rotational rate along one of three mutually-orthogonal axes (e.g., roll rate, pitch rate, and yaw rate). Temperature sensors 28A, 28B, and 28C are mounted (e.g., on the same circuit board) proximate accelerometers 24A-24C and rate gyroscopes 32A-32C to sense a temperature of an operational environment within inertial sensor assembly 16. For instance, temperature sensor 28A can be mounted proximate accelerometer 24A and rate gyroscope 32A to sense a temperature of an operational environment within inertial sensor assembly 16 proximate accelerometer 24A and rate gyroscope 32A. Temperature sensor 28B can be mounted proximate accelerometer 24B and rate gyroscope 32B to sense a temperature of an operational environment within inertial sensor assembly 16 proximate accelerometer 24B and rate gyroscope 32B. Temperature sensor 28C can be mounted proximate accelerometer 24C and rate gyroscope 32C to sense a temperature of an operational environment within inertial sensor assembly 16 proximate accelerometer 24C and rate gyroscope 32C. Any one or more of accelerometers 24A-24B, temperature sensors 28A-28C, and rate gyroscopes 32A-32C can be implemented as micro-electromechanical systems (MEMS). In some examples, temperature sensors 28A-28C can be magneto-resistive sensors.

As illustrated, inertial sensor assembly 16 further includes analog-to-digital (A-to-D) converters 26, 30, and 34. Each of A-to-D converters 26, 30, and 34 includes discrete and/or integrated logic circuitry to convert an analog signal input, such as a voltage, to a digital numerical representation proportional to a magnitude of the analog signal input. In operation, A-to-D converter 26 converts a voltage output from each of accelerometers 24A-24C to a digital numerical representation proportional to a magnitude of the voltage output from the respective one of accelerometers 24A-24C. A-to-D converter 30 converts a voltage output from each of temperature sensors 28A-28C to a digital numerical representation proportional to a magnitude of the voltage output from the respective one of temperature sensors 28A-28C. A-to-D converter 34 converts a voltage output from each of rate gyroscopes 32A-32C to a digital numerical representation proportional to a magnitude of the voltage output from the respective one or rate gyroscopes 32A-32C.

Each of air data parameter module 15, inertial sensor compensation and correction module 18, angular rate blending module 19, attitude determination module 20, and Kalman estimator module 22 can be implemented in hardware, software, or combinations of hardware and software. For example, air data computer 10A can include one or more processors and computer-readable memory encoded with instructions that, when executed by the one or more processors, cause air data computer 10A to operate in accordance with techniques described herein. Examples of the one or more processors include any one or more of a microprocessor, a controller, a digital signal processor (DSP), an application specific integrated circuit (ASIC), a field-programmable gate array (FPGA), or other equivalent discrete or integrated logic circuitry. Computer-readable memory of air data computer 10A can be configured to store information within air data computer 10A during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of air data computer 10A can include volatile and non-volatile memories. Examples of volatile memories can include random access memories (RAM), dynamic random access memories (DRAM), static random access memories (SRAM), and other forms of volatile memories Examples of non-volatile memories can include magnetic hard discs, optical discs, floppy discs, flash memories, or forms of electrically programmable memories (EPROM) or electrically erasable and programmable (EEPROM) memories.

As illustrated in FIG. 2, the outputs of A-to-D converter 26, A-to-D converter 30, and A-to-D converter 34 are provided as inputs to inertial sensor compensation and correction module 18, which also receives Kalman scale factor and bias error corrections from Kalman estimator module 22. Inertial sensor compensation and correction module 18, in some examples, outputs body-axis accelerations 12 and body-axis angular rates 14 (i.e., error-corrected output values) via, e.g., a data bus or other communicative connection for use by an inertial navigation system or other consuming system. In other examples, body-axis accelerations 12 and body-axis angular rates 14 may not be output to consuming systems, but rather may be used internally by air data computer 10A.

Body-axis accelerations 12 and body-axis angular rates 14 are provided by inertial sensor compensation and correction module 18 to Kalman estimator module 22 as inputs. Body-axis accelerations 12 and body-axis angular rates 14 are further provided by inertial sensor compensation and correction module 18 to angular rate blending module 19 as inputs. Angular rate blending module 19 further receives body-axis accelerations 13 as input from air data computer 10B (FIG. 1), as well as aircraft center of rotation position information COR from, e.g., an auto-flight control system or other system of the aircraft. Angular rate blending module 19 provides blended aircraft angular rates $\omega_{Blend}$ as output to attitude determination module 20. In addition, angular rate blending module 19 outputs aircraft angular acceleration $\dot{\omega}$, which is received as input by Kalman estimator module 22.

Attitude determination module 20 receives blended aircraft angular rates $\omega_{Blend}$ as input from angular rate blending module 19, as well as tilt error correction values $\delta q$ (e.g., attitude error correction values corresponding to aircraft pitch and aircraft roll) and initial attitude quaternion $q^C_{init}$ from Kalman estimator module 22. Attitude determination module 20 provides attitude information outputs to Kalman estimator module 22 in the form of attitude quaternion $q^C$. In addition, attitude determination module 20 provides aircraft attitude outputs in the form of aircraft roll angle $\phi_A$ and aircraft pitch angle $\theta_A$, which are output to consuming systems via, e.g., an aircraft data bus.

Kalman estimator module 22 receives attitude quaternion $q^C$ as input from attitude determination module 20, true airspeed 36 and angle of attack 39 as input from air data parameter module 15, and attitude information in the form of aircraft roll angle $\phi_B$, aircraft pitch angle $\theta_B$, roll angle error covariance $P_{\phi,B}$, and pitch angle error covariance $P_{\theta,B}$ as input from air data computer 10B (FIG. 1). Kalman estimator module 22 further receives aircraft angular acceleration $\dot{\omega}$ as input from angular rate blending module 19, as well as aircraft center of rotation position information COR from e.g., an auto-flight control system or other system of the aircraft. Kalman estimator module 22 provides Kalman scale factor and bias error corrections to inertial sensor compensation and correction module 18 for use in modifying inputs received from accelerometers 24A-24C and rate gyroscopes 32A-32C to produce error-corrected outputs: body-axis accelerations 12; and body-axis angular rates 14. Kalman estimator module 22 further provides as outputs: roll angle error covariance $P_{\phi,A}$ representing a covariance of an error of aircraft roll angle $\phi_A$; and pitch angle error covariance $P_{\theta,A}$ representing a covariance of an error of aircraft pitch angle $\theta_A$. Roll angle error covariance $P_{\phi,A}$ and pitch angle error covariance $P_{\theta,A}$ are output via an aircraft data bus or other communicative connection for use by air data computer 10B or other consuming system.

In operation, accelerometers 24A-24C and rate gyroscopes 32A-32C sense acceleration forces and rotational rates along the three mutually-orthogonal axes. Temperature sensors 28A-28C sense a temperature of an operational environment of accelerometers 24A-24C and rate gyroscopes 32A-32C, for example on one or more circuit boards within a housing of air data computer 10A that encloses components of air data computer 10A. The outputs of each of accelerometers 24A-24C, temperature sensors 28A-28C, and rate gyroscopes 32A-32C are provided to inertial sensor compensation and correction module 18 via A-to-D converters 26, 30, and 34, illustrated in FIG. 2 as $V_A$, $V_T$, and $V_\omega$. That is, $V_A$ represents a three-dimensional vector, each element of the vector corresponding to the output from one of accelerometers 24A, 24B, and 24C. Similarly, $V_T$ represents a three-dimensional vector, each element corresponding to the output from one of temperature sensors 28A, 28B, and 28C. $V_\omega$ also represents a three-dimensional vector, each element of the vector corresponding to the output from one of rate gyroscopes 32A, 32B, and 32C.

Inertial sensor compensation and correction module 18 applies compensation and correction factors to adjust each of the inputs $V_A$, $V_T$, and $V_\omega$ to produce body-axis accelerations 12 and body-axis angular rates 14. Body-axis accelerations 12 and body-axis angular rates 14 each represent three-axis outputs of error-compensated and error-corrected output values corresponding to the adjusted inputs $V_A$, $V_T$, and $V_\omega$. As is further described below, inertial sensor compensation and correction module 18 applies compensation and correction factors to inputs $V_A$, $V_T$, and $V_\omega$ to adjust inputs $V_A$, $V_T$, and $V_\omega$ to compensate for sensor scale factor errors corresponding to an error in the slope of the sensor output over a temperature range, bias errors corresponding to a non-zero offset in the sensor output over the temperature range, non-linearity errors corresponding to non-linearity of the sensor output over the temperature range, and non-orthogonality errors corresponding to offsets in the mutual-orthogonality of the sensor installations along the three axes within inertial sensor assembly 16. Such temperature-dependent scale factor errors, temperature-dependent bias errors, non-linearity errors, and non-orthogonality errors can be considered deterministic in nature. As such, compensation and correction factors applied by inertial sensor compensation and correction module 18 to compensate sensor inputs $V_A$, $V_T$, and $V_\omega$ for the deterministic errors can be pre-determined during, e.g., a testing phase in a laboratory or manufacturing facility and stored in computer-readable memory of air data computer 10A for use by inertial sensor compensation and correction module 18 during operation.

Accordingly, inertial sensor compensation and correction module 18 applies compensation and correction factors to adjust sensor inputs $V_A$, $V_T$ and $V_\omega$ to compensate for deterministic errors, such as temperature dependent errors and sensor installation position and alignment errors. In addition, as illustrated in FIG. 2, inertial sensor compensation and correction module 18 receives Kalman scale factor and bias error correction values from Kalman estimator module 22 and also applies the Kalman scale factor and bias error correction values to sensor inputs $V_A$, $V_T$ and $V_\omega$ to correct for non-deterministic sensor errors, as is further described below.

Inertial sensor compensation and correction module 18 outputs the error-compensated and error-corrected sensor inputs $V_A$, $V_T$ and $V_\omega$ (i.e., compensated and corrected via application of the temperature-dependent scale factor error compensation values, the Kalman scale factor error correction values, the temperature-dependent bias error compensation values, the Kalman bias error correction values, the non-linearity error compensation values, and the non-orthogonality error compensation values) as body-axis accelerations 12 and body-axis angular rates 14. As such, body-axis accelerations 12 and body-axis angular rates 14 represent error-compensated and error-corrected output values of accelerometers 24A-24C and rate gyroscopes 32A-32C, respectively, after compensation for deterministic errors (e.g., temperature-dependent scale factor errors, temperature-dependent bias errors, sensor non-linearity errors, and non-orthogonality errors) and correction for non-deterministic scale factor and bias errors that may arise during operation of air data computer 10A (e.g., turn-on to turn-on bias and scale factor errors, vibration-related bias and scale factor errors, or other non-deterministic errors).

As is further described below, angular rate blending module 19 utilizes body-axis accelerations 12, body-axis accelerations 13, body-axis angular rates 14, and aircraft center of rotation position information COR to determine aircraft angular acceleration $\dot{\omega}$. Angular rate blending module 19 blends aircraft angular acceleration $\dot{\omega}$ with body-axis angular rates 14 to provide a more accurate angular rate $\omega_{Blend}$ (e.g., having a lower rate of random walk errors). Blended aircraft angular rates $\omega_{Blend}$ are provided as output to attitude determination module 20. Aircraft angular acceleration $\dot{\omega}$ is provided to Kalman estimator module 22, which utilizes the angular acceleration and aircraft center of rotation position information COR to remove centripetal and tangential acceleration effects, as is further described below.

Attitude determination module 20 utilizes blended aircraft angular rates $\omega_{Blend}$ as well as tilt error correction values $\delta q$ to propagate initial attitude quaternion $q^C_{init}$ forward in time to determine aircraft attitude quaternion $q^C$ corresponding to a coordinate transform between local level and body-axis coordinate frames, i.e., the aircraft roll and pitch angles. Accordingly, attitude determination module 20 utilizes tilt error correction values $\delta q$ (representing aircraft attitude error correction values determined by Kalman estimator module 22) and blended aircraft angular rates $\omega_{Blend}$ for attitude determination operations, thereby increasing an accuracy of aircraft roll angle $\phi_A$ and aircraft pitch angle $\theta_A$ that are output to consuming systems for operational control of the aircraft, as well as attitude quaternion $q^C$ that is provided as output to Kalman estimator module 22.

As illustrated in FIG. 2, Kalman estimator module 22 receives as inputs body-axis accelerations 12 and body-axis angular rates 14 from inertial sensor compensation and correction module 18, as well as true airspeed 36 and angle of attack 38 from air data parameter module 15 and attitude information in the form of aircraft roll angle $\phi_B$, aircraft pitch angle $\theta_B$, roll angle error covariance $P_{\phi,B}$, and pitch angle error covariance $P_{\theta,B}$ from air data computer 10B (FIG. 1). In addition, Kalman estimator module 22 receives attitude information corresponding to aircraft roll and pitch in the form of attitude quaternion $q^C$ from attitude determination module 20.

Kalman estimator module 22 utilizes attitude quaternion $q^C$ determined by attitude determination module 20 as well as body-axis accelerations 12 and body-axis angular rates 14 to determine a change in an integrated body-axis acceleration over a relatively short time duration (e.g., 0.5 seconds, 1.0 second, or other time durations), as is further described below. Kalman estimator module 22 compares the determined change in the integrated body-axis acceleration over the time duration to a difference in the received true airspeed 36 over the same time duration to determine an airspeed difference value. Kalman estimator module 22 provides the airspeed difference value as input to an extended Kalman filter implemented by Kalman estimator module 22 that determines estimated scale factor errors and bias errors for each of accelerometers 24A-24C and rate gyroscopes 32A-32C, as well as tilt error correction values q representing aircraft attitude error correction values. In addition, the extended Kalman filter utilizes attitude information received from air data computer 10B (FIG. 1) in the form of aircraft roll angle $\phi_B$, aircraft pitch angle $\theta_B$, roll angle error covariance $P_{\phi,B}$, and pitch angle error covariance $P_{\theta,B}$ in determining the estimated scale factor errors, bias errors, and tilt error correction values δq. Tilt error correction values δq are applied by attitude determination module 20 during attitude determinations. The estimated scale factor errors and bias errors for each of accelerometers 24A-24C and rate gyroscopes 32A-32C are provided to inertial sensor compensation and correction module 18 as Kalman scale factor error correction values and Kalman bias error correction values associated with each of accelerometers 24A-24C and rate gyroscopes 32A-32C.

Inertial sensor compensation module 18 applies the received Kalman scale factor error correction values and bias error correction values, the temperature-dependent scale factor and bias error compensation values, the non-linearity error compensation values, and the non-orthogonality error compensation values to each of the received inputs from accelerometers 24A-24C and rate gyroscopes 32A-32C to produce error-corrected body-axis accelerations 12 and body-axis angular rates 14. Accordingly, air data computer 10A, implementing techniques of this disclosure, iteratively determines aircraft tilt error correction values δq that are utilized by attitude determination module 20 to produce error-corrected aircraft attitude information, as well as Kalman scale factor and bias error correction values that are applied to (e.g., subtracted from, added to, or otherwise applied to) sensed values from accelerometers 24A-24C and rate gyroscopes 32A-32C to correct for non-deterministic scale factor errors and bias errors that are unpredictable in nature. The compensation for deterministic errors (e.g., via the temperature-dependent scale factor and bias error compensation values, the non-linearity error compensation values, and the non-orthogonality error compensation values) as well as the non-deterministic errors (e.g., via the Kalman scale factor and bias error correction values) increases the accuracy of body-axis accelerations 12 and body-axis angular rates 14 that can be output from air data computer 10A to consuming systems and/or utilized internally by air data computer 10A. Moreover, utilization of attitude and acceleration information from external sources, such as air data computer 10B (FIG. 1), increases the accuracy of attitude error correction estimates, which in turn improves attitude accuracy.

Figure 3:
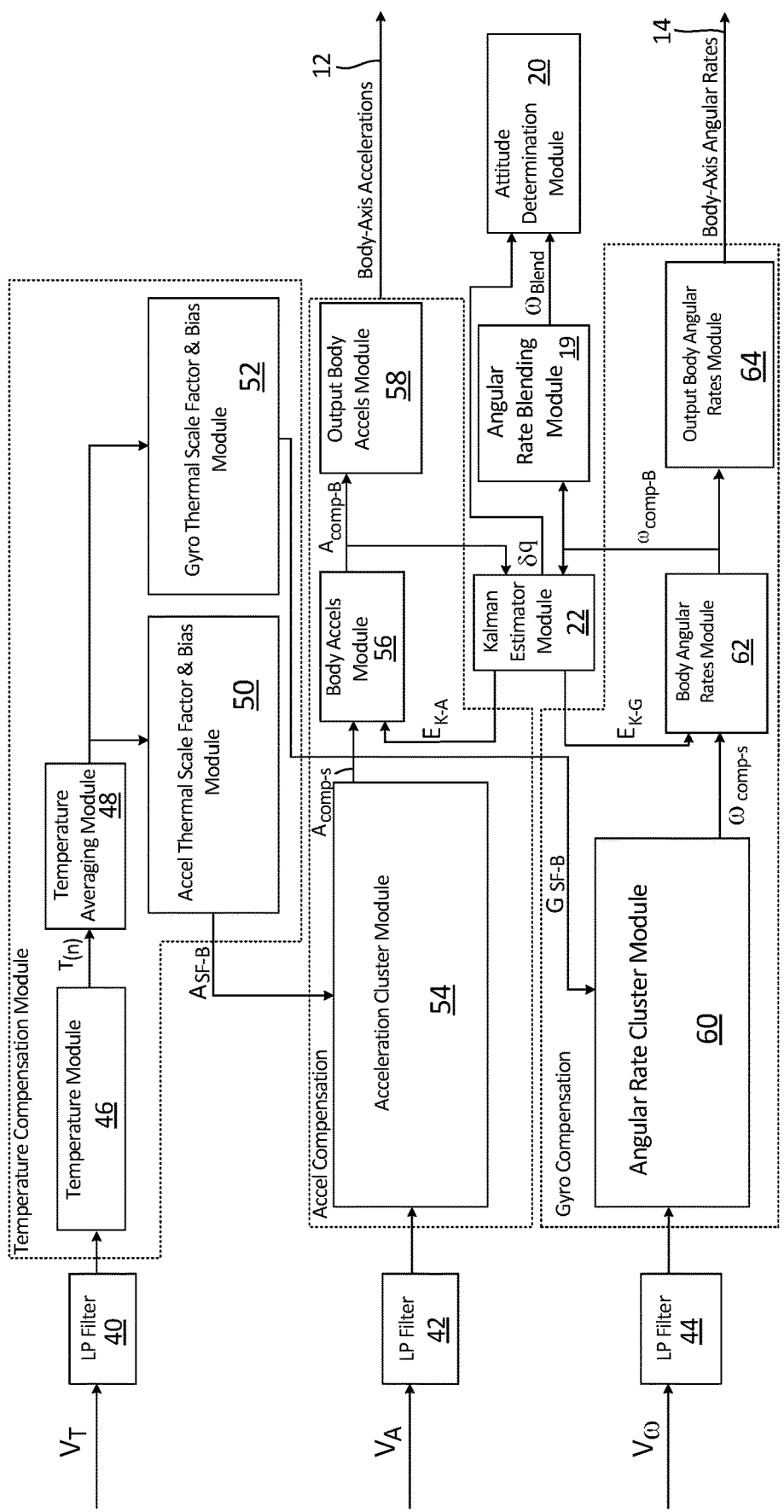
FIG. 3 is a schematic block diagram illustrating further details of the inertial sensor compensation and correction module of FIG. 2 to produce error-corrected acceleration and angular rate outputs.

FIG. 3 is a schematic block diagram illustrating further details of inertial sensor compensation and correction module 18 of FIG. 2 to produce error-corrected body-axis accelerations 12 body-axis angular rates 14. As illustrated in FIG. 3, inertial sensor compensation and correction module 18 includes temperature low-pass filter 40, accelerometer low-pass filter 42, rate gyroscope low-pass filter 44, temperature module 46, temperature averaging module 48, accelerometer thermal scale factor and bias module 50, rate gyroscope thermal scale factor and bias module 52, acceleration cluster module 54, body accelerations module 56, output body accelerations module 58, angular rate cluster module 60, body angular rates module 62, and output body angular rates module 64. As further illustrated, inertial sensor compensation and correction module 18 receives $V_T$, $V_A$, and $V_\omega$ as inputs from inertial sensor assembly 16 (FIG. 2). In addition, inertial sensor compensation and correction module 18 receives Kalman accelerometer scale factor and bias error correction values $E_{K-A}$ and Kalman rate gyroscope scale factor and bias error correction values $E_{K-G}$ from Kalman estimator module 22. Inertial sensor compensation and correction module 18 outputs body-axis accelerations 12 and body-axis angular rates 14 which, in some examples, are output via one or more communication data buses for use by a consuming system, such as an aircraft inertial navigation system, stability augmentation system, or other consuming system. In addition, inertial sensor compensation and correction module 18 provides compensated and corrected body-axis accelerations $A_{comp-B}$ as input to Kalman estimator module 22 as well as compensated and corrected body-axis angular rates $\omega_{comp-B}$ as input to both Kalman estimator module 22 and angular rate blending module 19. Kalman estimator module 22 provides tilt error correction values q as input to attitude determination module 20.

Each of temperature low-pass filter 40, accelerometer low-pass filter 42, and rate gyroscope low-pass filter 44 are low-pass filters (e.g., Butterworth low-pass filters or other types of low-pass filters) implemented in hardware and/or software and configured to pass signals with frequencies lower than a cutoff frequency and attenuate signals with frequencies higher than the cutoff frequency. Each of temperature low-pass filter 40, accelerometer low-pass filter 42, and rate gyroscope low-pass filter 44 can be configured with a same or different cutoff frequency.

The output of temperature low-pass filter 40 is provided to temperature module 46, which in turn provides temperatures T(n) as outputs to each of accelerometer thermal scale factor and bias module 50 and rate gyroscope thermal scale factor and bias module 52. Accelerometer thermal scale factor and bias module 50 outputs temperature-dependent accelerometer scale factor and bias error compensation values $A_{SF-B}$ to acceleration cluster module 54. Rate gyroscope thermal scale factor and bias module 52 outputs temperature-dependent rate gyroscope scale factor and bias error compensation values $G_{SF-B}$ to angular rate cluster module 60. The combined operations of temperature module 46, temperature averaging module 48, accelerometer thermal scale factor and bias module 50, and rate gyroscope thermal scale factor and bias module 52 form temperature compensation operations that provide temperature compensation scale factor and bias error compensation values for application to (e.g., subtraction from) input values sensed by accelerometers 24A-24C and rate gyroscopes 32A-32C (FIG. 2).

Acceleration cluster module 54 receives the temperature compensation scale factor and bias error compensation values $A_{SF-B}$ from accelerometer thermal scale factor and bias module 50 and applies the temperature-dependent accelerometer scale factor error compensation values and the temperature-dependent accelerometer bias error compensation values, as well as the accelerometer non-linearity error compensation values and the accelerometer non-orthogonality error compensation values (e.g., stored in computer-readable memory of air data computer 10) to produce compensated accelerometer values $A_{comp-S}$ in the sensor axis that are provided to body accelerations module 56. Body accelerations module 56 receives the compensated sensor-axis accelerations $A_{comp-S}$ from acceleration cluster module 54 and Kalman accelerometer scale factor and bias error correction values $E_{K-A}$ from Kalman estimator module 22. Body accelerations module 56 converts the compensated sensor-axis accelerations $A_{comp-S}$ to the aircraft (or other vehicle) body-axis and applies the Kalman accelerometer scale factor and bias error correction values $E_{K-A}$ to produce compensated and corrected accelerometer values $A_{comp-B}$ in the body-axis frame of reference that are provided as input to both output body accelerations module 58 and Kalman estimator module 22. Output body accelerations module 58 bandwidth-limits the received compensated and corrected body-axis accelerations $A_{comp-B}$ to produce body-axis accelerations 12. The combined operations of acceleration cluster module 54, body accelerations module 56 and output body accelerations module 58 form accelerometer compensation operations that apply both deterministic error compensation values (e.g., temperature-dependent accelerometer scale factor error compensation values, temperature-dependent accelerometer bias error compensation values, accelerometer non-linearity error compensation values, and accelerometer non-orthogonality error compensation values) and non-deterministic correction values (e.g., Kalman accelerometer scale factor error correction values and Kalman accelerometer bias error correction values) to produce body-axis accelerations 12 (i.e., accelerations along each of the three axes of accelerometers 24A-24C) that are error-compensation and error-corrected for both the deterministic and non-deterministic errors.

As further illustrated in FIG. 3, angular rate cluster module 60 receives the temperature compensation scale factor and bias error compensation values $G_{SF-B}$ from rate gyroscope thermal scale factor and bias module 52 and applies the temperature-dependent rate gyroscope scale factor error compensation values and the temperature-dependent rate-gyroscope bias error compensation values, as well as the rate gyroscope non-linearity error compensation values and the rate gyroscope non-orthogonality error compensation values (e.g., stored in computer-readable memory of air data computer 10A) to produce compensated angular rate values $\omega_{comp-S}$ in the sensor axis that are provided to body angular rates module 62. Body angular rates module 62 receives the compensated sensor-axis angular rate values $\omega_{comp-S}$ from angular rate cluster module 60 and Kalman rate gyroscope scale factor and bias error correction values $E_{K-G}$ from Kalman estimator module 22. Body angular rates module 62 converts the compensated sensor-axis angular rates $\omega_{comp-S}$ to the aircraft (or other vehicle) body-axis frame of reference and applies the Kalman rate gyroscope scale factor and bias error correction values $E_{K-G}$ to produce compensated and corrected angular rate values $\omega_{comp-B}$ in the body-axis that are provided as input to output body angular rates module 64, Kalman estimator module 22, and angular rate blending module 19. Output body angular rates module 64 bandwidth-limits the received compensated and corrected body-axis angular rates $\omega_{comp-B}$ to produce body-axis angular rates 14. The combined operations of angular rate cluster module 60, body angular rates module 62 and output body angular rates module 64 form rate gyroscope compensation operations that apply deterministic error compensation values (e.g., temperature-dependent rate gyroscope scale factor error compensation values, temperature-dependent rate gyroscope bias error compensation values, rate gyroscope non-linearity error compensation values, and rate gyroscope non-orthogonality error compensation values) and non-deterministic error-correction values (e.g., Kalman rate gyroscope scale factor error correction values and Kalman rate gyroscope bias error correction values) to produce body-axis angular rates 14 (i.e., angular rates in each of the three axes of rate gyroscopes 32A-32C) that are error-compensation and error-corrected to compensate and correct for both the deterministic and non-deterministic errors.

In operation, temperature module 46 receives low-pass filtered inputs $V_T$ from low-pass filter 40 which represents a three-dimensional vector, each element corresponding to a filtered digital representation of a voltage output of one of temperature sensors 28A, 28B, and 28C. Temperature module 46 converts the voltage representation associated with each of temperature sensors 28A-28C to a separate temperature value using a polynomial curve-fit having coefficients selected during, e.g., a testing phase to fit an output of the respective temperature sensors 28A-28C to a reference temperature input. Temperature module 46 provides temperatures T(n) (i.e., three temperature values, each corresponding to one of temperature sensors 28A-28C) to temperature averaging module 48. Temperature averaging module produces an average temperature output for each of the received input temperatures T(n), such as by using a moving average (e.g., over 8 samples, 10 samples, or other number of samples) or other central tendency technique. Temperature averaging module 48 provides the average temperature associated with each of temperature sensors 28A-28C to each of accelerometer thermal scale factor and bias module 50 and rate gyroscope thermal scale factor and bias module 52.

Accelerometer thermal scale factor and bias module 50 determines a temperature-dependent accelerometer scale factor error compensation value and a temperature-dependent accelerometer bias error compensation value corresponding to each of accelerometers 24A-24C. For example, accelerometer thermal scale factor and bias module 50 can apply the average input temperature value for the one of temperature sensors 28A-28C that is associated with (e.g. mounted proximate) accelerometer 24A as input to a polynomial curve fit of temperature-dependent accelerometer scale factor errors corresponding to accelerometer 24A having coefficients determined during, e.g., a testing phase (e.g., in a laboratory or manufacturing phase). Accelerometer thermal scale factor and bias module 50 can similarly apply average input temperature values for each of temperature sensors 28B and 28C that are associated with accelerometers 24B and 24C as input to separate polynomial curve fits of temperature-dependent accelerometer scale factor errors corresponding to each of accelerometer 24B and 24C having coefficients determined during the testing and/or manufacturing phase. Accelerometer thermal scale factor and bias module 50 applies the average temperature input value for each of temperature sensors 28A-28C as input to polynomial curve fits of temperature-dependent bias errors corresponding to each of accelerometers 24A-24C (each of the polynomial curve fits having coefficients determined during the testing and/or manufacturing phase) to determine temperature-dependent bias error compensation values corresponding to each of accelerometers 24A-24C.

Rate gyroscope thermal scale factor and bias module 52 determines a temperature-dependent rate gyroscope scale factor error compensation value and a temperature-dependent rate gyroscope bias error compensation value corresponding to each of rate gyroscopes 32A-32C. For example, rate gyroscope thermal scale factor and bias module 52 can apply the average input temperature value for the one of temperature sensors 28A-28C that is associated with (e.g. mounted proximate) rate gyroscope 32A as input to a polynomial curve fit of temperature-dependent rate gyroscope scale factor errors corresponding to rate gyroscope 32A having coefficients determined during, e.g., a testing phase (e.g., in a laboratory or manufacturing phase). Rate gyroscope thermal scale factor and bias module 52 can similarly apply average input temperature values for each of temperature sensors 28B and 28C that are associated with rate gyroscopes 32B and 32C as input to separate polynomial curve fits of temperature-dependent rate gyroscope scale factor errors corresponding to each of rate gyroscopes 32B and 32C having coefficients determined during the testing and/or manufacturing phase. Rate gyroscope thermal scale factor and bias module 52 applies the average temperature input value for each of temperature sensors 28A-28C as input to polynomial curve fits of temperature-dependent bias errors corresponding to each of rate gyroscopes 32A-32C (each of the polynomial curve fits having coefficients determined during the testing and/or manufacturing phase) to determine temperature-dependent bias error compensation values corresponding to each of rate gyroscopes 32A-32C.

Acceleration cluster module 54 receives the temperature-dependent accelerometer scale factor error compensation values and the temperature-dependent accelerometer bias error compensation values from accelerometer thermal scale factor and bias module 50. In addition, acceleration cluster module 54 receives low-pass filtered inputs $V_A$ from low-pass filter 42 which represents a three-dimensional vector, each element corresponding to a filtered digital representation of a voltage output of one of accelerometers 24A, 24B, and 24C. Acceleration cluster module 54 converts the voltage representation of each filtered input $V_A$ to an acceleration value (e.g., in meters/second/second). In addition, acceleration cluster module 54 applies the received temperature-dependent accelerometer scale factor error compensation values corresponding to each of accelerometers 24A-24C to the inputs $V_A$, such as by multiplying each of inputs $V_A$ by the corresponding temperature-dependent accelerometer scale factor error compensation value. Acceleration cluster module 54 applies the received temperature-dependent accelerometer bias error compensation values corresponding to each of accelerometers 24A-24C to the inputs $V_A$ via aggregation techniques (e.g., summing, subtracting, or other aggregation techniques). In addition, acceleration cluster module 54 applies (e.g., multiplies) the non-linearity error compensation values and the non-orthogonality error compensation values corresponding to each of accelerometers 24A-24C (e.g., determined during a testing and/or manufacturing phase and stored in computer-readable memory of air data computer 10A) to the respective inputs $V_A$ to produce compensated sensor-axis accelerations $A_{comp-S}$. Sensor-axis accelerations $A_{comp-S}$ therefore represent acceleration values associated with each of accelerometers 24A-24C in the sensor axis that have been compensated for deterministic errors corresponding to temperature-dependent scale factor and bias errors, sensor non-linearity errors, and non-orthogonality errors associated with a misalignment (i.e., non-mutually-orthogonal) of installation of accelerometers 24A-24C.

Body accelerations module 56 receives the compensated sensor-axis accelerations $A_{comp-S}$ and converts the accelerations from the sensor coordinate frame to an aircraft (or other vehicle to which air data computer 10A is mounted) coordinate frame using a rotational matrix such as a direction cosine matrix having direction angles configured to transform the sensor coordinate frame to the aircraft body axis frame. In addition, body accelerations module 56 receives Kalman accelerometer scale factor and bias error correction values $E_{K-A}$ from Kalman estimator module 22. As is further described below, Kalman accelerometer scale factor and bias error correction values $E_{K-A}$ include scale factor error correction values and bias error correction values produced by an extended Kalman filter implemented by Kalman estimator module 22, each of the scale factor error correction values and bias error correction values corresponding to one of accelerometers 24A-24C. Body accelerations module 56 applies the Kalman accelerometer scale factor and bias error correction values $E_{K-A}$ to the compensated acceleration values $A_{comp-S}$ to produce compensated and corrected acceleration values $A_{comp-B}$ in the body axis corresponding to each of accelerometers 24A-24C. The body axis can be defined by three mutually-orthogonal axes, a first of the three axes directed through the nose of the aircraft, a second of the three axes directed generally through a right wing of the aircraft, and a third of the three axes directed orthogonally to the first axis and to the second axis and generally through the bottom of the aircraft toward the Earth when the aircraft is on-ground. Compensated and corrected acceleration values $A_{comp-B}$ therefore represent body axis (e.g., aircraft body axis) accelerations corresponding to each of accelerometers 24A-24C that are compensated for deterministic errors (e.g., temperature-dependent scale factor and bias errors, sensor non-linearity errors, and non-orthogonality errors) and corrected for non-deterministic errors via Kalman scale factor and bias error correction values $E_{K-A}$.

Body accelerations module 56 provides compensated and corrected acceleration values $A_{comp-B}$ to output body accelerations module 58 and Kalman estimator module 22. Output body accelerations module 58 bandwidth-limits the output of compensated and corrected acceleration values $A_{comp-B}$ via, e.g., an infinite impulse response (IIR) or other bandwidth-limiting filter to a defined bandwidth of a consuming system, such as an aircraft inertial navigation system. The bandwidth-limited acceleration values are provided by output body accelerations module 58 as body-axis accelerations 12.

As further illustrated in FIG. 3, temperature-dependent rate gyroscope scale factor and error compensation values and temperature-dependent rate gyroscope bias error compensation values determined by rate gyroscope thermal scale factor and bias module 52 are provided to angular rate cluster module 60 as input. In addition, angular rate cluster module 60 receives low-pass filtered inputs $V_\omega$ from low-pass filter 44 which represents a three-dimensional vector, each element corresponding to a filtered digital representation of a voltage output of one of rate gyroscopes 32A, 32B, and 32C. Angular rate cluster module 60 converts the voltage representation of each filtered input $V_\omega$ to an angular rate value (e.g., in meters/second). In addition, angular rate cluster module 60 applies the received temperature-dependent rate gyroscope scale factor error compensation values corresponding to each of rate gyroscopes 32A-32C to the inputs $V_\omega$, such as by multiplying each of inputs $V_\omega$ by the corresponding temperature-dependent rate gyroscope scale factor error compensation value. Angular rate cluster module 60 applies the received temperature-dependent rate gyroscope bias error compensation values corresponding to each of rate gyroscopes 32A-32C to the inputs $V_\omega$ via aggregation techniques (e.g., summing, subtracting, or other aggregation techniques). In addition, angular rate cluster module 50 applies (e.g., multiplies) the non-linearity error compensation values and the non-orthogonality error compensation values corresponding to each of rate gyroscopes 32A-32C (e.g., determined during a testing and/or manufacturing phase and stored in computer-readable memory of air data computer 10A) to the respective inputs $V_\omega$ to produce compensated sensor-axis angular rates $\omega_{comp\text{-}S}$. Sensor-axis angular rates $\omega_{comp\text{-}S}$ therefore represent angular rate values associated with each of rate gyroscopes 32A-32C in the sensor axis that have been compensated for deterministic errors corresponding to temperature-dependent scale factor and bias errors, sensor non-linearity errors, and non-orthogonality errors associated with a misalignment (i.e., non-mutually-orthogonal) of installation of rate gyroscopes 32A-32C.

Body angular rates module 62 receives the compensated sensor-axis angular rate values $\omega_{comp\text{-}S}$ and converts the accelerations from the sensor coordinate frame to an aircraft (or other vehicle to which air data computer 10A is mounted) coordinate frame using a rotational matrix such as a direction cosine matrix having direction angles configured to transform the sensor coordinate frame to the aircraft body axis frame. In addition, body angular rates module 60 receives Kalman rate gyroscope scale factor and bias error correction values $E_{K\text{-}G}$ from Kalman estimator module 22. As is further described below, Kalman rate gyroscope scale factor and bias error correction values $E_{K\text{-}G}$ include scale factor error correction values and bias error correction values produced by the extended Kalman filter implemented by Kalman estimator module 22, each of the scale factor error correction values and bias error correction values corresponding to one of rate gyroscopes 32A-32C. Body angular rates module 62 applies the Kalman rate gyroscope scale factor and bias error correction values $E_{K\text{-}G}$ to the compensated angular rate values $\omega_{comp\text{-}S}$ to produce compensated and corrected angular rate values $\omega_{comp\text{-}B}$ in the body axis corresponding to each of rate gyroscopes 32A-32C. As described above, the body axis can be defined by three mutually-orthogonal axes, a first of the three axes directed through the nose of the aircraft, a second of the three axes directed generally through a right wing of the aircraft, and a third of the three axes directed orthogonally to the first axis and to the second axis and generally through a bottom of the aircraft toward the Earth when the aircraft is on-ground. Compensated and corrected angular rate values $\omega_{comp\text{-}B}$ therefore represent body axis (e.g., aircraft body axis) angular rates corresponding to each of rate gyroscopes 32A-32C that are compensated for deterministic errors (e.g., temperature-dependent scale factor and bias errors, sensor non-linearity errors, and non-orthogonality errors) as well as corrected for non-deterministic errors via Kalman scale factor and bias error correction values $E_{K\text{-}G}$.

Body angular rates module 62 provides compensated and corrected angular rate values $\omega_{comp\text{-}B}$ to each of output body angular rates module 64, attitude determination module 20, and Kalman estimator module 22. Output body angular rates module 64 bandwidth-limits the output of compensated and corrected angular rate values $\omega_{comp\text{-}B}$ via, e.g., an infinite impulse response (IIR) or other bandwidth-limiting filter to a defined bandwidth required by a consuming system, such as an aircraft inertial navigation system. The bandwidth-limited angular rate values are provided by output body angular rates module 64 as body-axis angular rates 14.

Accordingly, air data computer 10A implementing techniques described herein produces body-axis accelerations 12 and body-axis angular rates 14 that are compensated to correct for deterministic errors and corrected for non-deterministic errors. The techniques of this disclosure therefore increase an accuracy of outputs of air data computer 10A and enable air data computer 10A to adaptively modify such outputs (i.e., body-axis angular rates 14 and body-axis accelerations 12) to account for unpredictable errors that can arise during operation of air data computer 10A manifesting as sensor bias and scale factor errors. Moreover, the techniques further improve an accuracy of attitude outputs in the presence of such stochastic noise manifesting as angular random walk noise from the rate gyroscopes.

Figure 4:
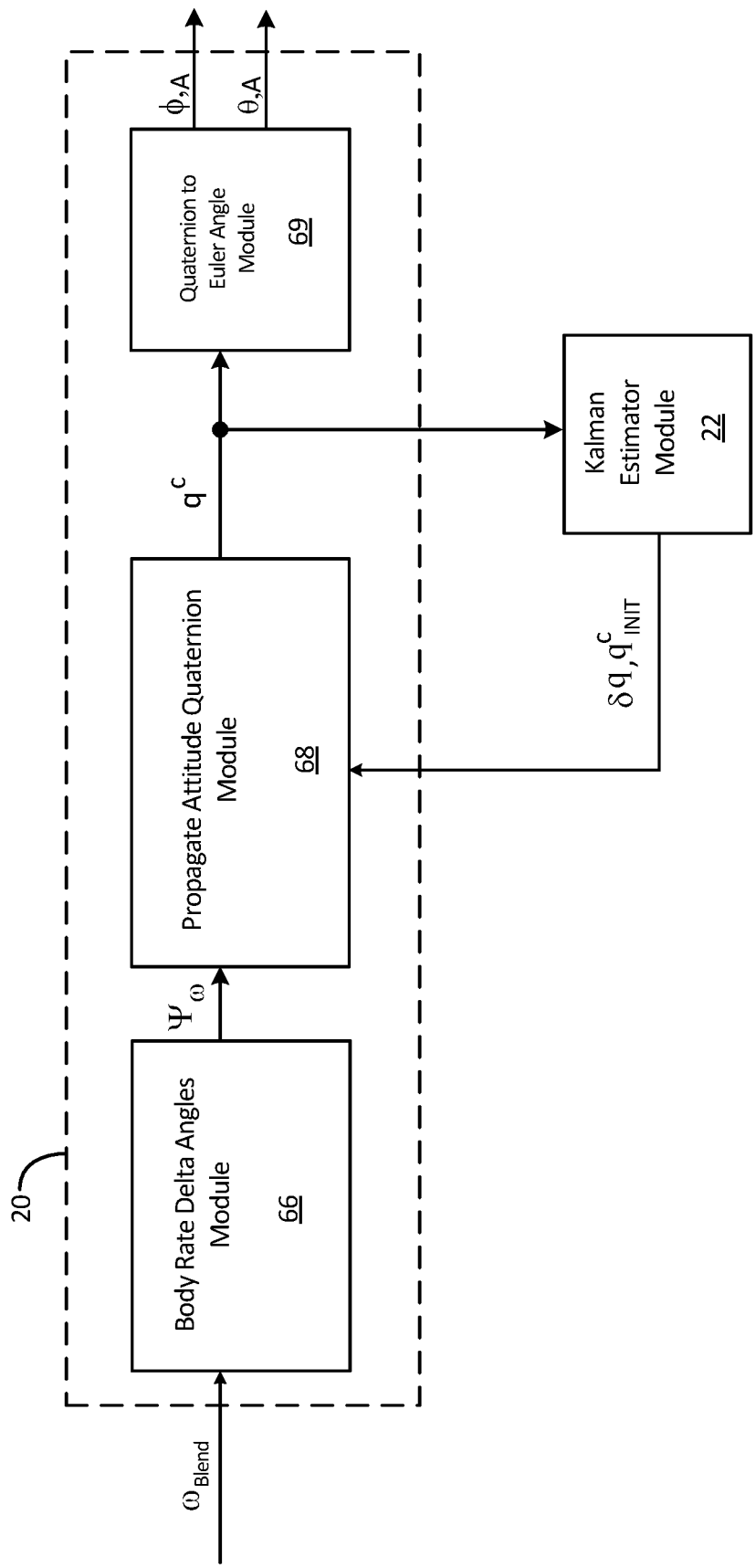
FIG. 4 is a schematic block diagram illustrating further details of the attitude determination module of FIG. 2 to determine aircraft attitude information using an error-corrected blended angular rate output.

FIG. 4 is a schematic block diagram illustrating further details of attitude determination module 20 of FIG. 2. As illustrated in FIG. 4, attitude determination module 20 includes body rate delta angles module 66, propagate attitude quaternion module 68, and quaternion to Euler angle module 69. Attitude determination module 20 receives blended aircraft angular rates $\omega_{Blend}$ as inputs from angular rate blending module 19. Attitude determination module 20 outputs attitude quaternion $q^C$ to Kalman estimator module 22. In addition, attitude determination module outputs aircraft roll angle $\phi_A$ and aircraft pitch angle $\theta_A$ for use by one or more consuming systems, such as an inertial navigation system, an auto flight control system, air data computer 10B, or other consuming systems.

As illustrated in FIG. 4, body rate delta angles module 66 receives blended aircraft angular rates $\omega_{Blend}$ from angular rate blending module 19 and provides angular displacement changes $\psi_\omega$ corresponding to each of rate gyroscopes 32A-32C as input to propagate attitude quaternion module 68. Propagate attitude quaternion module 68 receives angular displacement changes $\psi_\omega$ as input from body rate delta angles module 66 as well as initial attitude quaternion $q^C_{init}$ and tilt error correction values $\delta q$ (e.g., representing aircraft attitude error correction values) from Kalman estimator module 22. Propagate attitude quaternion module 68 provides attitude quaternion $q^C$ as input to each of Kalman estimator module 22 and quaternion to Euler angle module 69. Quaternion to Euler angle module 69 receives attitude quaternion $q^C$ from propagate attitude quaternion module 68 and outputs aircraft roll angle $\phi_A$ and aircraft pitch angle $\Theta_A$ via, e.g., an aircraft data bus or other communicative connection.

In operation, body rate delta angles module 66 receives blended aircraft angular rates $\omega_{Blend}$ corresponding to the blended aircraft angular rate and compensated and corrected outputs of each of rate gyroscopes 32A-32C. Body rate delta angles module 66 integrates the blended aircraft angular rates $\omega_{Blend}$ over a relatively short time interval, such as 0.001 seconds (i.e., corresponding to a 1 kHz sampling rate) to produce angular displacement changes $\psi_\omega$ corresponding to a change in angular displacement over the time interval.

Propagate attitude quaternion module 68 receives angular displacement changes $\psi_\omega$ from body rate delta angles module 66 and propagates the angular displacement changes over the time interval (e.g., 0.001 seconds) in quaternion form to produce attitude quaternion $q^C$. Propagate attitude quaternion module 68 receives initial attitude quaternion $q^C_{init}$ from Kalman estimator module 22 representing an initial attitude of air data computer 10A, as is further described below. Propagate attitude quaternion module 68 propagates the received angular displacement changes $\psi_\omega$ over the time interval relative to the initial attitude quaternion $q^C_{init}$ received from Kalman estimator module 22 (e.g., during a first execution of the attitude propagation operations). Propagate attitude quaternion module 68 applies tilt error correction values $\delta q$ to the propagated attitude quaternion (e.g., via quaternion multiplication) to produce the error-corrected attitude quaternion $q^C$. Quaternion to Euler angle module 69 converts attitude quaternion $q^C$ to Euler angle representation, as is generally known in the art. Quaternion to Euler angle module 69 outputs the Euler angle corresponding to the aircraft roll axis as aircraft roll angle $\phi_A$. Quaternion to Euler angle module 69 outputs the Euler angle corresponding to the aircraft pitch axis as aircraft pitch angle $\theta_A$.

As such, air data computer 10A implementing techniques of this disclosure determines vehicle attitude information represented by attitude quaternion $q^C$ that is utilized by Kalman estimator module 22 to estimate sensor scale factor and bias errors that are provided as feedback to adjust and correct the sensed output values of accelerometers 24A-24C and gyroscopes 32A-32C. In addition, air data computer 10A outputs attitude information in the form of aircraft roll angle $\phi_A$ and aircraft pitch angle $\theta_A$ that are utilized by consuming systems for operational control of the aircraft.

Figure 5:
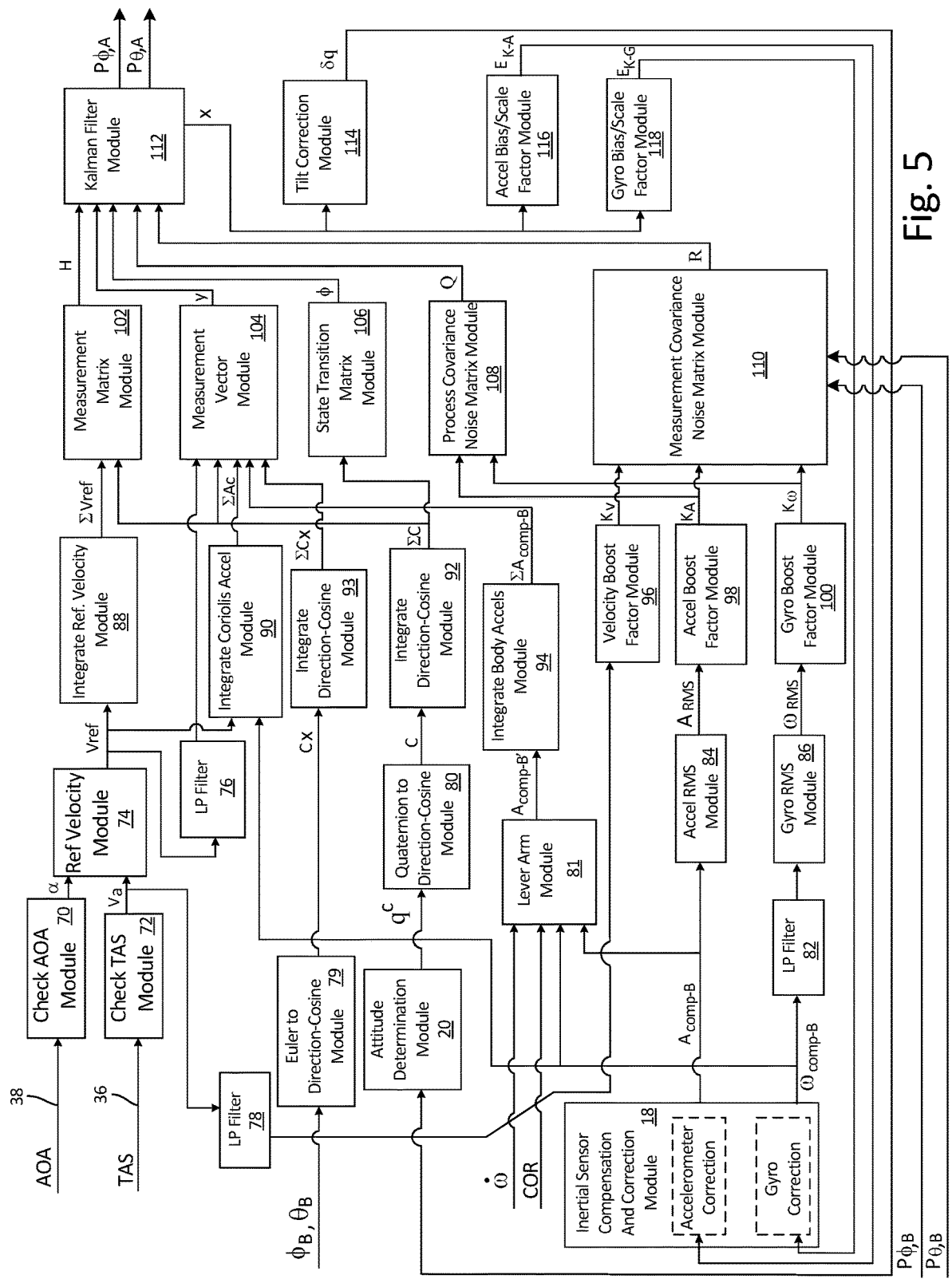
FIG. 5 is a schematic block diagram illustrating further details of the Kalman estimator module of FIG. 2 to produce pitch and roll error covariance estimates as well as bias and scale factor error correction values that are utilized by the air data computer to produce error-corrected attitude, acceleration and angular rate outputs.

FIG. 5 is a schematic block diagram illustrating further details of Kalman estimator module 22 to produce roll angle error covariance $P_{\phi,A}$ representing an estimated covariance of an error of roll angle $\phi_A$, pitch angle error covariance $P_{\theta,A}$ representing an estimated covariance of an error of pitch angle $\theta_A$, Kalman accelerometer scale factor and bias error correction values $E_{K-A}$, Kalman rate gyroscope scale factor and bias error correction values $E_{K-G}$, and tilt error correction values $\delta q$.

As illustrated in FIG. 5, Kalman estimator module 22 includes check angle of attack (AOA) module 70, check true airspeed (TAS) module 72, reference velocity module 74, low-pass filter 76, low-pass filter 78, Euler to direction-cosine module 79, quaternion to direction-cosine module 80, lever arm module 81, low-pass filter 82, accelerometer root mean square (RMS) module 84, rate gyroscope RMS module 86, integrate reference velocity module 88, integrate Coriolis acceleration module 90, integrate direction-cosine module 92, integrate direction-cosine module 93, integrate body accelerations module 94, velocity boost factor module 96, accelerometer boost factor module 98, rate gyroscope boost factor module 100, measurement matrix module 102, measurement vector module 104, state transition matrix module 106, process covariance noise matrix module 108, measurement covariance noise matrix module 110, Kalman filter module 112, tilt correction module 114, accelerometer bias and scale factor module 116, and rate gyroscope bias and scale factor module 118. As further illustrated, Kalman estimator module 22 receives as inputs: true airspeed 36 and angle of attack 38 from air data parameter module 15; attitude quaternion $q^C$ from attitude determination module 20; compensated and corrected body-axis accelerations $A_{comp-B}$ and compensated and corrected body-axis angular rates $\omega_{comp-B}$ from inertial sensor compensation and correction module 18; aircraft roll angle $\phi_B$, aircraft pitch angle $\theta_B$, aircraft roll error covariance $P_{\phi,B}$, and aircraft pitch error covariance $P_{\theta,B}$ from air data computer 10B (FIG. 1); aircraft angular acceleration $\dot{\omega}$ from angular rate blending module 19; and aircraft center of rotation position information COR from, e.g., a flight control computer or other aircraft system. Kalman estimator module 22 outputs: tilt error correction values $\delta q$, which are received as input by attitude determination module 20; accelerometer scale factor and bias error correction values $E_{K-A}$, as well as rate gyroscope scale factor and bias error correction values $E_{K-G}$, which are received as input by inertial sensor compensation and correction module 18; and aircraft roll error covariance $P_{\phi,A}$, and aircraft pitch error covariance $P_{\theta,A}$ that are output via an aircraft data bus or other communicative connection for use by, e.g., air data computer 10B (FIG. 1).

Check AOA module 70 receives angle of attack 38 as input, and outputs angle of attack $\alpha$ to reference velocity module 74. Check TAS module 72 receives true airspeed 36 as input and provides airspeed Va as output to reference velocity module 74 and low-pass filter 78, which passes the filtered reference velocity as input to velocity boost factor module 96. Compensated and corrected body-axis accelerations $A_{comp-B}$ are received as input by both accelerometer RMS module 84 and lever arm module 81. Compensated and corrected body-axis angular rates $\omega_{comp-B}$ are received as input by each of low-pass filter 82, lever arm module 81, and integrate Coriolis accelerations module 90. Attitude quaternion $q^C$ is received as input by quaternion to direction-cosine module 80. Aircraft roll angle $\phi_B$ and aircraft pitch angle $\theta_B$ are received as input by Euler to direction-cosine module 79.

Reference velocity module 74 outputs body-axis reference velocity vector $V_{ref}$, which is received as input by each of integrate reference velocity module 88, low-pass filter 76, and integrate Coriolis acceleration module 90. Low-pass filter 76 provides a filtered output of body-axis reference velocity vector $V_{ref}$ to measurement vector module 104. Integrate reference velocity module 88 outputs integrated body-axis reference velocity vector $\Sigma V_{ref}$ to measurement matrix module 102. Integrate Coriolis accelerations module 90 outputs integrated Coriolis acceleration $\Sigma A_C$ to measurement vector module 104. Euler to direction-cosine module 79 outputs cross-side direction-cosine matrix $C_X$ to integrate direction-cosine module 93, which provides integrated cross-side direction-cosine matrix $\Sigma C_X$ as output to measurement vector module 104. Quaternion to direction-cosine module 80 outputs direction-cosine matrix C to integrate direction-cosine module 92, which provides integrated direction-cosine matrix $\Sigma C$ as output to each of measurement matrix module 102, measurement vector module 104, and state transition matrix module 106. Lever arm module 81 outputs compensated and corrected body-axis accelerations $A_{comp-B'}$ to integrate body accelerations module 94. Integrate body accelerations module 94 outputs integrated compensated and corrected body-axis accelerations $\Sigma A_{comp-B}$ to measurement vector module 104. Accelerometer RMS module 84 receives compensated and corrected body-axis accelerations $A_{comp-B}$ from inertial sensor compensation and correction module 18, and outputs accelerations root mean square $A_{RMS}$ to accelerometer boost factor module 98. Rate gyroscope RMS module 86 receives filtered compensated and corrected body-axis angular rates $\omega_{comp-B}$ from low-pass filter 82 and outputs angular rates root mean square $\omega_{RMS}$ to rate gyroscope boost factor module 100. Velocity boost factor module outputs velocity boost factor $K_V$ to measurement covariance noise matrix module 110. Accelerometer boost factor module 98 outputs acceleration boost factor $K_A$, which is received as input by each of process covariance noise matrix module 108 and measurement covariance noise matrix module 110. Rate gyroscope boost factor module 100 outputs angular rate boost factor $K_\omega$ to each of process covariance noise matrix module 108 and measurement covariance noise matrix module 110.

Measurement matrix module 102 outputs measurement matrix H to Kalman filter module 112. Measurement vector module 104 provides measurement vector y as input to Kalman filter module 112. State transition matrix module 106 outputs state transition matrix $\phi$, which is received as input by Kalman filter module 112. Process covariance noise matrix module 108 outputs process covariance noise matrix Q, and measurement covariance noise matrix module 110 outputs measurement covariance noise matrix R. Each of process covariance noise matrix Q and measurement covariance noise matrix R is received as input by Kalman filter module 112.

Kalman filter module 112 outputs Kalman state vector X, which is received as input by each of tilt correction module 114, accelerometer bias and scale factor module 116, and rate gyroscope bias and scale factor module 118. In addition, Kalman filter module 112 outputs aircraft roll error covariance $P_{\phi,A}$ and aircraft pitch error covariance $P_{\theta,B}$ as output to consuming systems, such as air data computer 10B (FIG. 1). Tilt correction module 114 outputs tilt error correction values δq to attitude determination module 20. Accelerometer bias and scale factor module 116 provides Kalman accelerometer scale factor and bias error correction values $E_{K-A}$ as input to inertial sensor compensation and correction module 118. Rate gyroscope bias and scale factor module 118 outputs Kalman rate gyroscope scale factor and bias error correction values $E_{K-G}$, which is received as input by inertial sensor compensation and correction module 18.

In operation, check AOA module 70 receives angle of attack 38 from, e.g., an aircraft air data system or other source. Check AOA module 70 determines whether the received angle of attack 38 is valid, such as by determining whether angle of attack 38 is within a predefined range of valid angles of attack and/or by accessing validity information included with angle of attack 38 (e.g., status field(s), bit(s), or other information indicating a validity status of angle of attack 38). Check AOA module 70 outputs angle of attack α as equal to the value (e.g., scalar value) of angle of attack 38 in response to determining that angle of attack 38 is valid. Check AOA module 70 outputs α as equal to a value of zero in response to determining that angle of attack 38 is invalid. Similarly, check TAS module 72 receives true airspeed 36 and determines a validity status of true airspeed 36 by determining whether true airspeed 36 is within a predefined range of valid true airspeeds and/or by accessing validity information included with true airspeed 36. Check TAS module 72 outputs airspeed Va as equal to the value (e.g., scalar value) of true airspeed 36 in response to determining that true airspeed 36 is valid. Check TAS module 72 outputs airspeed Va as equal to a value of zero in response to determining that true airspeed 36 is invalid.

Each of low-pass filters 76, 78, and 82 can be Butterworth filters, infinite impulse response filters, or other types of low-pass filters implemented in hardware and/or software and configured to pass signals with frequencies lower than a cutoff frequency and attenuate signals with frequencies higher than the cutoff frequency. Each of low-pass filters 76, 78, and 82 can be configured with a same or different cutoff frequency, and can be implemented using the same or different types of low-pass filters. Low-pass filter 78 receives airspeed Va and provides a filtered output of airspeed Va to velocity boost factor module 96.

Reference velocity module 74 utilizes angle of attack α and airspeed Va to produce body-axis reference velocity vector $V_{ref}$. That is, reference velocity module 74 uses angle of attack α to convert the received scalar airspeed Va into a vector representation of the body frame velocity by attributing the airspeed Va to the forward and vertical body-axis velocity components using angle of attack α. Low-pass filter 76 receives body-axis reference velocity vector $V_{ref}$ and provides a low-pass filtered output of body-axis reference velocity vector $V_{ref}$ as input to measurement vector module 104. Euler to direction-cosine module 79 converts aircraft roll angle $\phi_B$ and aircraft pitch angle $\theta_B$ (i.e., Euler angles in pitch and roll axes) to direction cosine form to produce cross-side direction-cosine matrix $C_X$ (i.e., representing the attitude information in direction-cosine form). Euler to quaternion module 79 converts aircraft roll angle $\phi_B$ and aircraft pitch angle $\theta_B$ (i.e., Euler angles in pitch and roll axes) to quaternion form produce cross-side attitude quaternion $q^{CX}$ representing attitude information of air data computer 10B (FIG. 1) in quaternion form. Quaternion to direction-cosine module 80 applies a transformation matrix to attitude quaternion $q^C$ representing attitude information of air data computer 10A (e.g., pitch, roll, and yaw) to produce direction-cosine matrix C representing the attitude information in direction-cosine form.

Lever arm module 81 utilizes aircraft angular acceleration $\dot{\omega}$, aircraft center of rotation position information COR, compensated and corrected body-axis accelerations $A_{comp-B}$, and compensated and corrected body-axis angular rates $\omega_{comp-B}$ to produce compensated and corrected body-axis accelerations $A_{comp-B'}$ having centripetal and tangential acceleration effects removed. For example, lever arm module 81 can determine the centripetal acceleration effect for each accelerometer according to the following equation:

$$A_C = \omega_{comp-B} \times \omega_{comp-B} \times R \quad \text{Equation (1)}$$

where $A_C$ is the centripetal acceleration effects vector, $\omega_{comp-B}$ is the compensated and corrected body-axis angular rates vector, and R is the position vector (i.e., lever arm distance) from a position of inertial sensor assembly 16 (FIG. 2) to the aircraft center of rotation position COR. That is, Kalman estimator module 22 can store a position of inertial sensor assembly 16 with respect to a landmark position of the aircraft in computer-readable memory, and can determine position vector R as the difference between the stored position of inertial sensor assembly 16 and the aircraft center of rotation position COR (i.e., a center of rotation position vector with respect to the landmark position of the aircraft). Lever arm module 81 determines the centripetal acceleration effect vector $A_C$ according to Equation (1) above as the triple cross product of compensated and corrected body-axis angular rates $\omega_{comp-B}$ with itself and with the determined position vector R.

Lever arm module 81 can determine the tangential acceleration effect for each accelerometer according to the following equation:

$$A_T = \dot{\omega} \times R \quad \text{Equation (2)}$$

where $A_T$ is the tangential acceleration effects vector and R is the position vector from the position of inertial sensor assembly 16 (FIG. 2) to the aircraft center of rotation position COR. Lever arm module 81 determines the tangential acceleration effect vector $A_T$ according to Equation (2) above as the cross product of aircraft angular acceleration vector $\dot{\omega}$ with the determined position vector R.

Lever arm module 81 determines compensated and corrected body-axis accelerations $A_{comp-B'}$ according to the following equation:

$$A_{comp-B'} = A_{comp-B} - A_C - A_T \quad \text{Equation (3)}$$

where $A_{comp-B'}$ is the compensated and corrected body-axis accelerations vector having centripetal and tangential acceleration effects removed, $A_{comp-B}$ is the compensated and corrected body-axis accelerations vector received from inertial sensor compensation and corrections module 18, $A_C$ is the centripetal acceleration effects vector determined according to Equation (1) above, and $A_T$ is the tangential acceleration effects vector determined according to Equation (2) above.

Each of integrate reference velocity module 88, integrate Coriolis acceleration module 90, integrate direction-cosine module 92, integrate direction-cosine module 93, and integrate body accelerations module 94 integrate their respective inputs over a same time duration, such as 0.5 seconds, 1.0 seconds, or other time durations. That is, integrate reference velocity module 88 integrates body-axis reference velocity vector $V_{ref}$ over the time duration using, e.g., trapezoidal integration or other numerical integration operations to produce integrated body-axis reference velocity vector $\Sigma V_{ref}$ that is provided to measurement matrix module 102. Integrate Coriolis acceleration module 90 determines an instantaneous Coriolis acceleration force experienced by accelerometers 24A-24C (FIG. 2) as a cross product of compensated and corrected body-axis angular rates $\omega_{comp-B}$ and body-axis reference velocity vector $V_{ref}$. Integrate Coriolis acceleration module 90 integrates the instantaneous Coriolis acceleration over the time duration (i.e., the same time duration utilized by integrate reference velocity module 88) to produce integrated Coriolis acceleration $\Sigma A_C$. Integrate direction-cosine module 92 integrates direction-cosine matrix C over the same time duration to produce integrated direction-cosine matrix $\Sigma C$. Integrate direction-cosine module 93 integrates cross-side direction-cosine matrix $C_X$ over the same time duration to produce integrated cross-side direction-cosine matrix $\Sigma C_X$. Integrate body accelerations module 94 integrates compensated and corrected body-axis accelerations $A_{comp-B}$, over the same time duration to produce integrated compensated and corrected body-axis accelerations $\Sigma A_{comp-B}$.

Accelerometer RMS module 84 receives compensated and corrected body-axis accelerations $A_{comp-B}$ and produces accelerations root mean square $A_{RMS}$ by computing a root mean square of the received acceleration compensated and corrected body-axis accelerations $A_{comp-B}$ or using other central tendency techniques. Rate gyroscopes RMS module 86 receives low-pass filtered compensated and corrected body-axis angular rates $\omega_{comp-B}$ from low-pass filter 82 and produces angular rates root mean square $\omega_{comp-B}$ by computing a root mean square of the received filtered compensated and corrected body-axis angular rates $\omega_{comp-B}$ or using other central tendency techniques.

Velocity boost factor module 96 receives low-pass filtered airspeed Va from low-pass filter 78 and produces velocity boost factor $K_V$ that is proportional to a rate of change of low-pass filtered airspeed Va with respect to time. That is, as the time rate of change of low-pass filtered airspeed Va increases, velocity boost factor $K_V$ increases. As the time rate of change of low-pass filtered airspeed Va decreases, velocity boost factor $K_V$ decreases. Similarly, accelerometer boost factor module 98 produces acceleration boost factor $K_A$ that is proportional to a time rate of change of accelerations root mean square $A_{RMS}$. Rate gyroscope boost factor module 100 produces angular rate boost factor $K_\omega$ that is proportional to a time rate of change of angular rates root mean square $\omega_{RMS}$.

Measurement matrix module 102, measurement vector module 104, state transition matrix module 106, process covariance noise matrix module 108, and measurement covariance noise matrix module 110 produce measurement matrix H, measurement vector y, state transition matrix $\phi$, process covariance noise matrix Q, and measurement covariance noise matrix R, respectively, which are utilized during execution of an extended Kalman filter implemented by Kalman filter module 112 to produce Kalman state vector X that includes tilt error correction values $\delta q$, Kalman accelerometer scale factor and bias error correction values $E_{K-A}$, and Kalman rate gyroscope scale factor and bias error correction values $E_{K-G}$. In addition, the extended Kalman filter utilizes an error covariance matrix of each state estimate during execution of the filter and extracts the error covariance corresponding to aircraft roll angle as aircraft roll angle error covariance $P_{\phi,A}$ and the error covariance corresponding to aircraft pitch angle as aircraft pitch angle error covariance $P_{\theta,A}$. Aircraft roll angle error covariance $P_{\phi,A}$ and aircraft pitch angle error covariance $P_{\theta,A}$ are output to, e.g., air data computer 10B (FIG. 1) via an aircraft data bus or other communicative connection.

Measurement matrix module 102 utilizes integrated reference velocity $\Sigma V_{ref}$ and integrated direction-cosine matrix $\Sigma C$ to produce measurement matrix H. Measurement vector module 104 utilizes low-pass filtered body-axis reference velocity vector $V_{ref}$, integrated Coriolis acceleration $\Sigma A_C$, integrated direction-cosine matrix $\Sigma C$, integrated compensated and corrected body-axis accelerations $\Sigma A_{comp-B}$, and integrated cross-side direction-cosine matrix $\Sigma C_X$ to generate measurement vector y. Measurement vector y represents a difference between a change in body-axis reference velocity vector $V_{ref}$ over a time duration and a change in integrated compensated and corrected body-axis accelerations $\Sigma A_{comp-B}$ over the same time duration with effects of integrated Coriolis acceleration $\Sigma A_C$ and gravity removed (e.g., added, subtracted, or otherwise removed). For example, measurement vector module 104 can add the integrated Coriolis acceleration $\Sigma A_C$ to the difference between the change in body-axis reference velocity vector $V_{ref}$ and integrated compensated and corrected body-axis accelerations $\Sigma A_{comp-B}$, and can subtract a value corresponding to the acceleration due to gravity (e.g., 9.8 meters/second/second) from the resulting sum. In addition, measurement vector y represents a change in aircraft attitude (e.g., aircraft pitch angle and aircraft roll angle) represented by quaternion $q^C$ received from attitude determination module 20 as well as a change in aircraft attitude represented by aircraft roll angle $\phi_B$ and aircraft pitch angle $\theta_B$ received from air data computer 10B (FIG. 1).

State transition matrix module 106 utilizes integrated direction-cosine matrix $\Sigma C$ to populate state transition matrix $\phi$ utilized by Kalman filter module 112 to propagate the Kalman state forward in time. Process covariance noise matrix module 108 utilizes acceleration boost factor $K_A$ and angular rate boost factor $K_\omega$ to produce process noise covariance matrix Q that represents an estimate of uncertainty corresponding to process noise introduced by computational uncertainties or other process noise. Measurement covariance noise matrix module 110 utilizes velocity boost factor $K_V$, acceleration boost factor $K_A$, and angular rate boost factor $K_\omega$ to produce measurement covariance noise matrix R that represents an estimate of uncertainty corresponding to sensor noise from accelerometers 24A-24C and rate gyroscopes 32A-32C (FIG. 2). Because each of velocity boost factor $K_V$, acceleration boost factor $K_A$, and angular rate boost factor $K_\omega$ are proportional to a rate of change of their respective inputs (i.e., low-pass filtered airspeed Va, accelerations root mean square $A_{RMS}$, and angular rates root mean square $\omega_{RMS}$), process covariance noise matrix module 108 and measurement covariance noise matrix module 110 effectively increase the effect of process covariance noise matrix Q and measurement covariance noise matrix R during execution of the extended Kalman filter implemented by Kalman filter module 112 during operational states corresponding to dynamic motion of air data computer 10A.

Kalman filter module 112 implements an extended Kalman filter that utilizes measurement matrix H, measurement vector y, state transition matrix $\phi$, process covariance matrix Q, and measurement covariance matrix R to produce Kalman state vector X. Kalman state vector X can be, e.g., a 16-element vector including (in any order): two tilt error correction values, one corresponding to pitch and the other corresponding to roll; three accelerometer bias error correction values, each corresponding to one of accelerometers 24A-24C; three accelerometer scale factor error correction values, each corresponding to one of accelerometers 24A-24C; three rate gyroscope bias error correction values, each corresponding to one of rate gyroscopes 32A-32C; three rate gyroscope scale factor error correction values, each corresponding to one of rate gyroscopes 32A-32C; and two transport rate error correction values corresponding to forward pitch rates experienced to maintain level flight while moving across the surface of the Earth. Kalman filter module 112 utilizes an error covariance matrix of the state estimate of the filter during each execution. Kalman filter module 112 extracts the error covariance corresponding to aircraft roll angle and outputs the error covariance as aircraft roll angle error covariance $P_{\phi,A}$. Kalman filter module 112 extracts the error covariance corresponding to aircraft pitch angle and outputs the error covariance as aircraft pitch angle error covariance $P_{\theta,A}$. Aircraft roll angle error covariance $P_{\phi,A}$ and aircraft pitch angle error covariance $P_{\theta,A}$ are output to consuming systems, such as air data computer 10B (FIG. 1) via an aircraft data bus or other communicative connection.

Tilt correction module 114 utilizes the two tilt error correction values and the two transport rate error correction values to produce tilt error correction values δq, which are utilized by attitude determination module 20 during propagation of attitude quaternion $q^C$, as is further described above. Accelerometer bias and scale factor module 116 applies (e.g., adds, subtracts, or otherwise applies) the three accelerometer bias error correction values to accelerometer bias error correction values determined during a previous execution (e.g., a previous iteration) of Kalman estimator module 22 to produce three updated accelerometer bias error correction values, each corresponding to one of accelerometers 24A-24C. Similarly, accelerometer bias and scale factor module 116 applies (e.g., adds, subtracts, or otherwise applies) the three accelerometer scale factor error correction values to accelerometer scale factor error correction values determined during a previous execution (e.g., a previous iteration) of Kalman estimator module 22 to produce three updated accelerometer scale factor error correction values, each corresponding to one of accelerometers 24A-24C. Accelerometer bias and scale factor module 116 outputs the three updated accelerometer bias error correction values and the three updated accelerometer scale factor error correction values as Kalman accelerometer scale factor and bias error correction values $E_{K-A}$, which are received as input by inertial sensor compensation and correction module 18 and utilized during accelerometer error correction operations.

Rate gyroscope bias and scale factor module 118 applies (e.g., adds, subtracts, or otherwise applies) the three rate gyroscope bias error correction values of Kalman state vector X to rate gyroscope bias error correction values determined during a previous execution (e.g., a previous iteration) of Kalman estimator module 22 to produce three updated rate gyroscope bias error correction values, each corresponding to one of rate gyroscopes 32A-32C. Similarly, rate gyroscope bias and scale factor module 118 applies (e.g., adds, subtracts, or otherwise applies) the three rate gyroscope scale factor error correction values to rate gyroscope scale factor error correction values determined during a previous execution (e.g., a previous iteration) of Kalman estimator module 22 to produce three updated rate gyroscope scale factor error correction values, each corresponding to one of rate gyroscopes 32A-32C. Rate gyroscope bias and scale factor module 118 outputs the three updated rate gyroscope bias error correction values and the three updated rate gyroscope scale factor error correction values as Kalman rate gyroscope scale factor and bias error correction values $E_{K-G}$, which are received as input by inertial sensor compensation and correction module 18 and utilized during rate gyroscope error correction operations.

Accordingly, air data computer 10A implementing Kalman estimator module 22 iteratively and adaptively determines scale factor and bias error correction values that are applied by inertial sensor compensation and correction module 18 to outputs of accelerometers 24A-24C and rate gyroscopes 32A-32C to produce error-compensated body-axis accelerations 12 and body-axis angular rates 14. Aircraft attitude information received from an external source, such as air data computer 10B, is utilized in the execution of an extended Kalman filter to increase accuracy of the scale factor and bias error correction values, thereby increasing accuracy of error-compensated body-axis accelerations 12, error-compensated body-axis angular rates 14, as well as aircraft roll angle output $\phi_A$ and aircraft pitch angle $\theta_A$ that are derived using the acceleration and angular rates.

Figure 6:
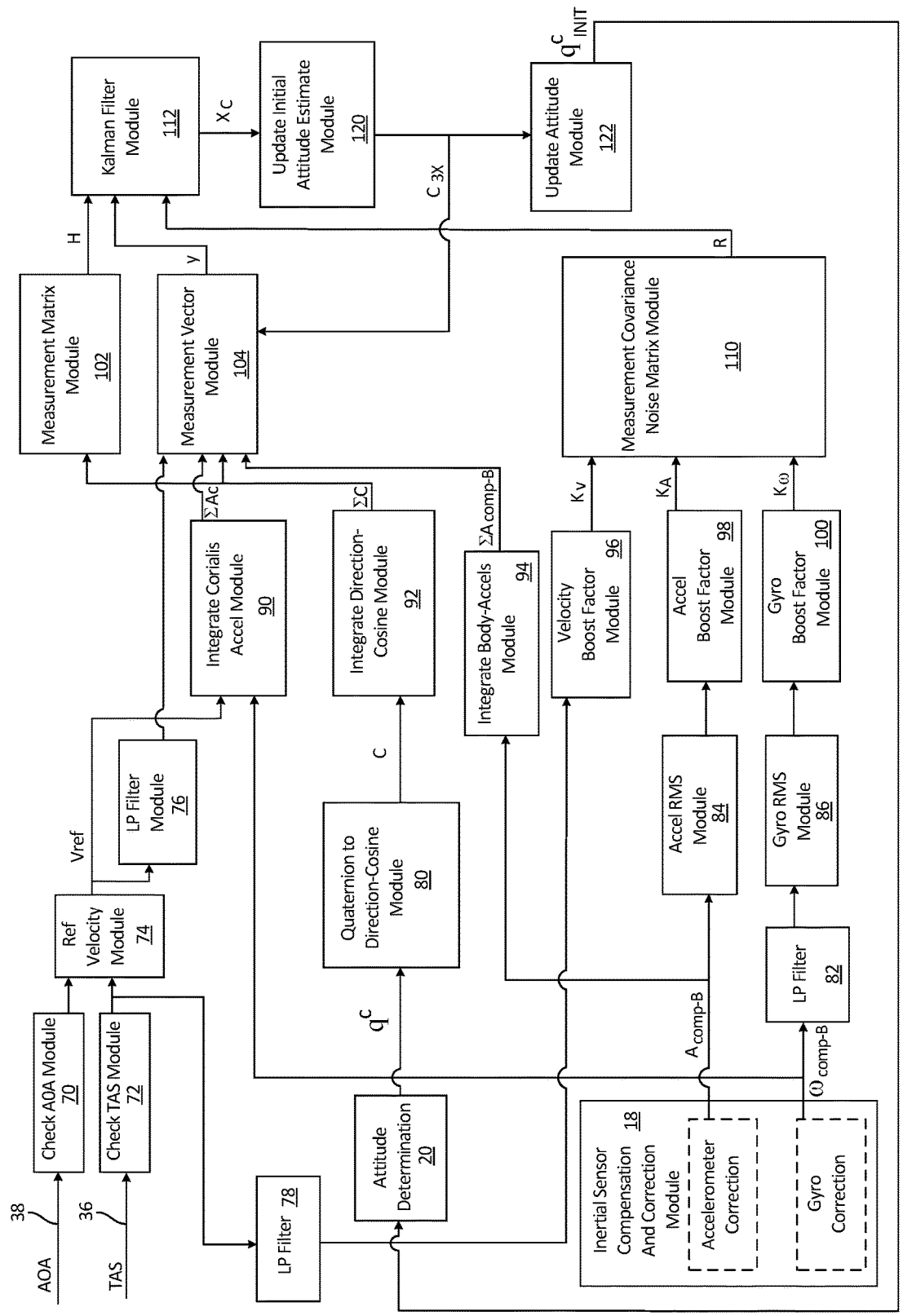
FIG. 6 is a schematic block diagram illustrating further details of the Kalman estimator module of FIG. 2 to produce an initial attitude quaternion representing an initial attitude of the air data computer.

FIG. 6 is a schematic block diagram illustrating details of Kalman estimator module 22 to produce initial attitude quaternion $q^C_{init}$ representing an initial attitude of air data computer 10A. That is, FIG. 6 illustrates details of Kalman estimator module 22 that are executed during an initialization phase of air data computer 10A, such as after initial power-up, reset, or other initialization phases. In general, many modules and operations of Kalman estimator module 22 described with respect to the example of FIG. 6 are substantially similar to the modules and operations of Kalman estimator module 22 that were described above with respect to FIG. 5. For purposes of clarity and ease of discussion, the same reference numbers are used for like modules, and only differences in modules and operations are described below with respect to the example of FIG. 6.

As illustrated in FIG. 6, Kalman estimator module 22 includes update initial attitude estimate module 120 and update attitude module 122, which are implemented by Kalman estimator module 22 during initialization operations. In the example of FIG. 6, measurement matrix module 102 receives integrated direction-cosine matrix ΣC from integrate direction-cosine module 92 and produces measurement matrix H, which is passed to Kalman filter module 112. Kalman filter module 112 receives measurement vector y, and measurement covariance matrix R as input and executes an extended Kalman filter to produce Kalman state vector $X_C$. Kalman state vector $X_C$ is a three-element vector, the three elements corresponding to error correction values of the third row (i.e., pitch and roll components) of integrated direction-cosine matrix ΣC. Kalman filter module 112 outputs state vector $X_C$ to update initial attitude estimate module 120, which applies (e.g., subtracts, adds, or otherwise applies) the error correction values from a previous execution (e.g., a previous iteration) of Kalman estimator module 22 to determine an updated initial attitude vector $C_{3X}$. Update initial attitude estimate module 120 outputs updated initial attitude vector $C_{3X}$ to measurement vector module 104, which applies (e.g., multiplies) updated initial attitude vector $C_{3X}$ to measurement vector y to produce an updated measurement vector y. Kalman estimator module 22 iteratively executes measurement vector module 104, Kalman filter module 112, and update initial attitude estimate module 120 for a threshold time duration, such as 10 seconds or other threshold time durations, to iteratively determine and modify updated initial attitude vector $C_{3X}$. Update initial attitude estimate module 120 provides updated initial attitude vector $C_{3X}$ to update attitude module 122, which converts the attitude information of initial attitude vector $C_{3X}$ to quaternion form and outputs initial attitude quaternion $q^C_{init}$ to attitude determination module 20 for use during initialization operations of air data computer 10A.

Accordingly, air data computer 10A implementing techniques of this disclosure, utilizes air data parameter values, such as true airspeed and angle of attack, to produce error-corrected angular rate and acceleration output values. Air data computer 10A determines vehicle attitude in the form of attitude quaternion $q^C$ based on sensed acceleration and rotational position information received from accelerometers 24A-24C and gyroscopes 32A-32C. The air data parameter values are utilized by Kalman estimator module 22 to estimate sensor scale factor and bias errors that are provided as feedback to further adjust and correct the sensed output values of accelerometers 24A-24C and gyroscopes 32A-32C. Accordingly, the techniques described herein can increase an accuracy of computations and, in some examples, outputs of air data computer 10A (i.e., body-axis angular rates 14 and body-axis accelerations 12) by modifying the outputs to compensate for deterministic errors (e.g., temperature-dependent scale factor and bias errors, sensor non-linearity errors, and non-orthogonality errors) and correct for non-deterministic errors that can manifest as sensor scale factor and bias errors that arise during operation of (or between operations of) air data computer 10A.

Figure 7:
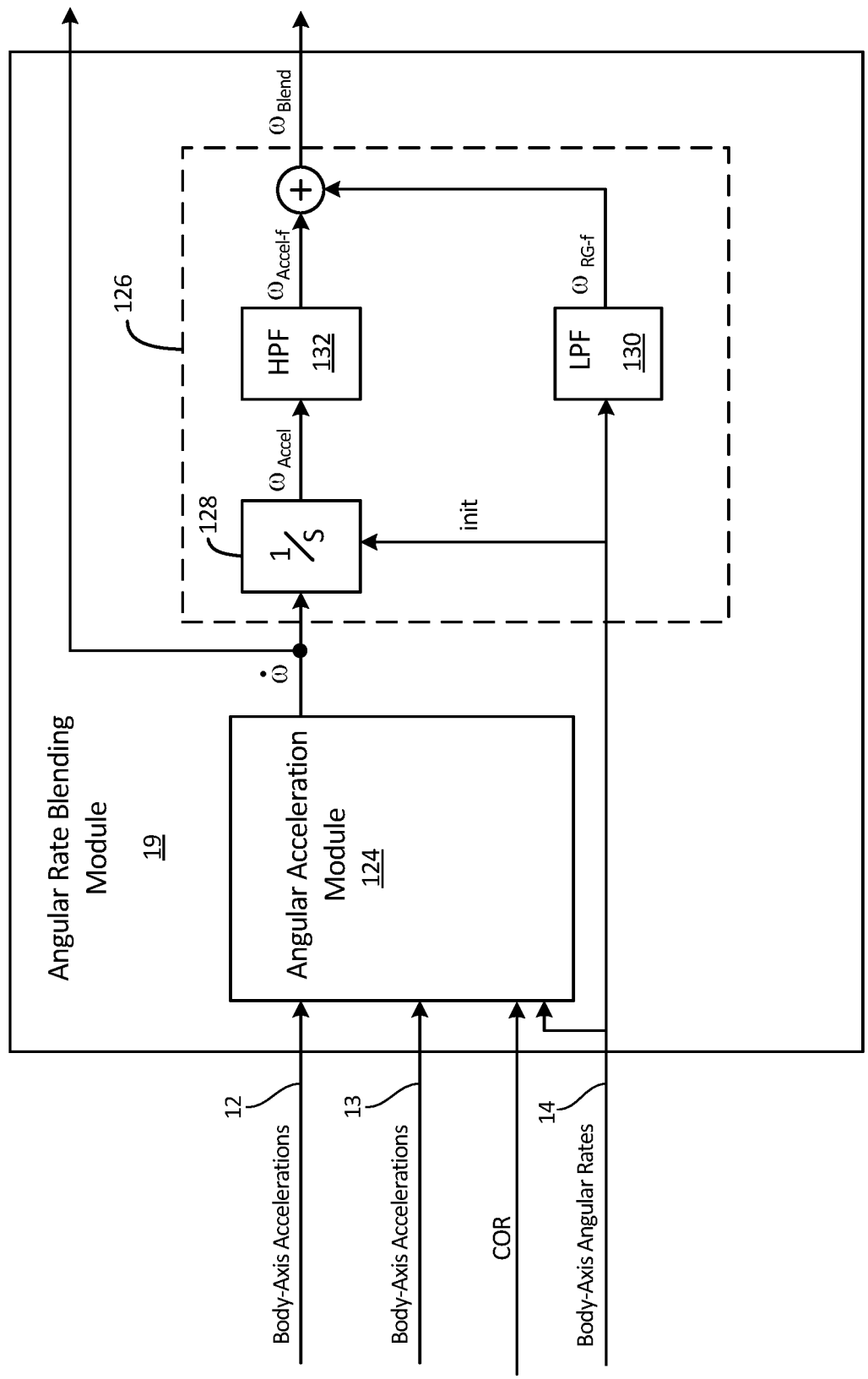
FIG. 7 is a schematic block diagram illustrating further details of the angular rate blending module of FIG. 2 to produce a blended angular rate output.

FIG. 7 is a schematic diagram illustrating further details of angular rate blending module 19 of FIG. 2 to produce blended aircraft angular rates $\omega_{Blend}$. As illustrated in FIG. 7, angular rate blending module 19 receives body-axis accelerations 12 and body-axis angular rates 14 as inputs from inertial sensor compensation and correction module 18 (FIG. 1). In addition, angular rate blending module 19 receives aircraft center of rotation position information COR as input from, e.g., an auto-flight control system or other system of the aircraft. Angular rate blending module 19 receives body-axis accelerations 13 from air data computer 10B (FIG. 1).

Angular rate blending module 19 includes angular acceleration module 124 and complementary filter 126. Complementary filter 126 includes integrator 128 (indicated in Laplace transform space as 1/S), low-pass filter (LPF) 130, high-pass filter (HPF) 132, and summing junction 134. Angular rate blending module 19 produces blended aircraft angular rates $\omega_{Blend}$ that are provided as output to attitude determination module 20 (FIG. 2). In addition, angular rate blending module 19 produces aircraft angular acceleration vector $\dot{\omega}$, which is provided as output to Kalman estimator module 22 (FIG. 2).

Angular acceleration module 124 determines aircraft angular acceleration $\dot{\omega}$ based on body-axis accelerations 12, body-axis accelerations 13, body-axis angular rates 14, and aircraft center of rotation position information COR. For example, angular acceleration module 124 can determine angular acceleration $\dot{\omega}$ according to the following equation:

$$\dot{\omega} = \begin{bmatrix} \dot{\omega}_x \\ \dot{\omega}_y \\ \dot{\omega}_z \end{bmatrix} = -\left( \begin{bmatrix} A^b_{ij,x} \\ A^b_{ij,y} \\ A^b_{ij,z} \end{bmatrix} - \begin{bmatrix} 0 & -\omega_z & \omega_y \\ \omega_z & 0 & -\omega_x \\ -\omega_y & \omega_x & 0 \end{bmatrix} \begin{bmatrix} 0 & -\omega_z & \omega_y \\ \omega_z & 0 & -\omega_x \\ -\omega_y & \omega_x & 0 \end{bmatrix} \begin{bmatrix} P^b_{ij,x} \\ P^b_{ij,y} \\ P^b_{ij,z} \end{bmatrix} \right) [P^b_{ij} \times]^{-1} \quad \text{Equation (4)}$$

where:
$\dot{\omega}_x$ is the angular acceleration in the aircraft body roll axis;
$\dot{\omega}_y$ is the angular acceleration in the aircraft body pitch axis;
$\dot{\omega}_z$ is the angular acceleration in the aircraft body yaw axis;
$A_{i,j,x}^b$ is the difference between body-axis accelerations 12 and body-axis accelerations 13 in the aircraft body roll axis;
$A_{i,j,y}^b$ is the difference between body-axis accelerations 12 and body-axis accelerations 13 in the aircraft body pitch axis;
$A_{i,j,z}^b$ is the difference between body-axis accelerations 12 and body-axis accelerations 13 in the aircraft body yaw axis;
$\omega_x$ is the element of body-axis angular rates 14 in the aircraft body roll axis;
$\omega_y$ is the element of body-axis angular rates 14 in the aircraft body pitch axis;
$\omega_z$ is the element of body-axis angular rates 14 in the aircraft body yaw axis;
$P_{i,j,x}^b$ is a predefined distance vector in the aircraft body roll axis from air data computer 10A to air data computer 10B;
$P_{i,j,y}^b$ is a predefined distance vector in the aircraft body pitch axis from air data computer 10A to air data computer 10B;
$P_{i,j,z}^b$ is a predefined distance vector in the aircraft body yaw axis from air data computer 10A to air data computer 10B; and
$[P_{ij}^b \times]^{-1}$ is defined as the following matrix:

$$\begin{bmatrix} \dfrac{P^b_{ij,x}}{2P^b_{ij,y} P^b_{ij,z}} & \dfrac{1}{2P^b_{ij,z}} & \dfrac{-1}{2P^b_{ij,y}} \\ \dfrac{1}{2P^b_{ij,z}} & \dfrac{P^b_{ij,y}}{2P^b_{ij,x} P^b_{ij,z}} & \dfrac{1}{2P^b_{ij,x}} \\ \dfrac{1}{2P^b_{ij,y}} & \dfrac{-1}{2P^b_{ij,x}} & \dfrac{-P^b_{ij,z}}{2P^b_{ij,x} P^b_{ij,y}} \end{bmatrix}$$

According to Equation (4) above, angular acceleration module 124 determines aircraft angular acceleration $\dot{\omega}$ as a three-element vector corresponding to angular acceleration in the aircraft body roll, pitch, and yaw axes. Each of aircraft angular acceleration $\dot{\omega}$ and body-axis angular rates 14 (e.g., a three-element vector corresponding to sensed angular rates in the aircraft body roll, pitch, and yaw axes) are provided to complementary filter 126. As illustrated in FIG. 7, complementary filter 126 includes integrator 128, low-pass filter 130, high-pass filter 132, and summing junction 134. Integrator 128 receives aircraft angular acceleration $\dot{\omega}$ as input from angular acceleration module 124 and provides accelerometer-based angular rate vector $\omega_{Accel}$, representing the integral of aircraft angular acceleration $\dot{\omega}$ with respect to time, as output to high-pass filter 132. In addition, body-axis angular rates 14 are provided to integrator 128 as an initial condition during a first execution of angular rate blending module 19 (e.g., on power-up of air data computer 10A).

High-pass filter 132 can be a Butterworth filter, an infinite impulse response filter, or other type of filter configured to pass signals with frequencies higher than a cutoff frequency and attenuate signals with frequencies lower than the cutoff frequency to remove low-frequency signal and noise from the input signal. Low-pass filter 130 can be a Butterworth filter, an infinite impulse response filter, or other type of filter configured to pass signals with frequencies lower than a cutoff frequency and attenuate signals with frequencies higher than the cutoff frequency to remove high frequency signal and noise from the input signal. In some examples, low-pass filter 130 and high-pass filter 132 can be matched to have the same cut-off frequency, such that where low-pass filter 130 begins to roll-off in gain, high pass filter 132 begins to roll-up in gain at the same rate.

High-pass filter 132 filters accelerometer-based angular rate vector $\omega_{Accel}$ to produce filtered accelerometer-based angular rate vector $\omega_{Accel\text{-}f}$ that is provided to summing junction 134. Low-pass filter 132 filters body-axis angular rates 14 to produce filtered rate gyroscope-based angular rate vector $\omega_{RG\text{-}f}$ that is provided to summing junction 134. Summing junction 134 blends (e.g., sums) filtered accelerometer-based angular rate vector $\omega_{Accel\text{-}f}$ and filtered rate gyroscope-based angular rate vector $\omega_{RG\text{-}f}$ to produce blended aircraft angular rates $\omega_{Blend}$. Blended aircraft angular rates $\omega_{Blend}$ are therefore a multi-element vector corresponding to the blended aircraft angular rate in the aircraft roll, pitch, and yaw axes. Though complementary filter 126 is illustrated in the example of FIG. 7 as including two filters (i.e., low-pass filter 130 and high-pass filter 132) as well as integrator 128 and summing junction 134, it should be understood that in some examples, integrator 128, low-pass filter 130, high-pass filter 132, and summing junction 134 can be combined into one multi-input single-output (MISO) filter that takes aircraft angular acceleration vector $\omega$ and body-axis angular rates 14 as inputs and produces blended aircraft angular rates $\omega_{Blend}$ as output.

As described herein, a system implementing techniques of this disclosure utilizes attitude information received from an external source (e.g., a second air data computer having a second inertial sensor assembly) as well as pressure-based air data parameters (e.g., true airspeed and angle of attack) to iteratively determine attitude correction values as well as estimated bias and/or scale factor errors of sensed acceleration and angular rate. The attitude error correction values are utilized to produce error-corrected attitude information, thereby increasing an accuracy of the aircraft attitude outputs. The bias and/or scale factor errors are removed from the sensed acceleration and angular rate parameters to produce error-corrected output values. Such error-corrected values are further utilized for subsequent attitude estimations, thereby further increasing an accuracy of the acceleration and angular rate outputs as well as the aircraft attitude outputs to consuming systems. Moreover, a system implementing techniques of this disclosure derives a blended aircraft angular rate using acceleration information from an external source to reduce effects of sensed centripetal and tangential forces. The blended aircraft angular rate, rather than the sensed angular rate, is utilized for attitude determinations, thereby further increasing an accuracy of the system outputs.

Discussion of Possible Embodiments

The following are non-exclusive descriptions of possible embodiments of the present invention.

A system includes a first air data computer that includes a first inertial sensor assembly. The first air data computer is configured to: sense, with the first inertial sensor assembly, acceleration and rotational rate of an aircraft; and determine first attitude information of the aircraft based on the acceleration and rotational rate sensed with the first inertial sensor assembly. The first air data computer is further configured to: receive second attitude information of the aircraft from a source external to the first air data computer; determine first attitude correction values based on the first attitude information and the second attitude information; apply the first attitude correction values to the first attitude information to produce first error-corrected attitude information of the aircraft; and output the first error-corrected attitude information.

The system of the preceding paragraph can optionally include, additionally and/or alternatively, any one or more of the following features, configurations and/or additional components:

The system can further include a second air data computer that includes a second inertial sensor assembly. The second air data computer can be configured to produce the second attitude information of the aircraft.

The second air data computer can be configured to: determine the second attitude information of the aircraft based on acceleration and rotational rate sensed by the second inertial sensor assembly; receive the first error-corrected attitude information from the first air data computer; determine second attitude correction values based on the second attitude information and the first error-corrected attitude information; apply the second attitude correction values to the second attitude information to produce second error-corrected attitude information of the aircraft, and output the second error-corrected attitude information.

The first attitude information can include: a first aircraft pitch angle; a first aircraft roll angle; a covariance estimate of an error of the first aircraft pitch angle; and a covariance estimate of an error of the first aircraft roll angle. The second attitude information received from the source external to the first air data computer can include: a second aircraft pitch angle; a second aircraft roll angle; a covariance estimate of an error of the second aircraft pitch angle; and a covariance estimate of an error of the second aircraft roll angle. The first air data computer can be configured to determine the first set of error correction values based on the first aircraft pitch angle, the first aircraft roll angle, the covariance estimate of the error of the first aircraft pitch angle, the covariance estimate of the error of the first roll angle, the second aircraft pitch angle, the second aircraft roll angle, the covariance estimate of the error of the second aircraft pitch angle, and the covariance estimate of the error of the second aircraft roll angle.

The first air data computer can be configured to determine the first attitude correction values via an extended Kalman filter that utilizes the first aircraft pitch angle, the first aircraft roll angle, the covariance estimate of the error of the first pitch angle, the covariance estimate of the error of the first roll angle, the second aircraft pitch angle, the second aircraft roll angle, the covariance estimate of the error of the second pitch angle, and the covariance estimate of the error of the second roll angle.

The first air data computer can be further configured to: determine a set of sensor error correction values based on the first attitude information and the second attitude information; apply the set of sensor error correction values to each of the acceleration and the rotational rate sensed with the first inertial sensor assembly to produce error-corrected acceleration and error-corrected rotational rate of the aircraft; and determine the first attitude information based on the first error-corrected acceleration and the first error-corrected rotational rate.

The first air data computer can be configured to receive acceleration information from the source external to the first air data computer. The first air data computer is configured to determine the first attitude information based on the error-corrected acceleration and the error-corrected rotational rate by being configured to: determine aircraft angular acceleration based on the error-corrected acceleration and the acceleration information received from the source external to the first air data computer; blend the aircraft angular acceleration and the error-corrected rotational rate using a complementary filter to produce a blended rotational rate;

and determine the first error-corrected attitude information based on the blended rotational rate.

The complementary filter can be configured to: integrate the aircraft angular acceleration to produce an accelerometer-based rotational rate of the aircraft; filter the accelerometer-based rotational rate to remove low frequency signal and noise to produce a high-pass filtered accelerometer-based rotational rate; filter the first error-corrected rotational rate to remove high frequency signal and noise to produce a low-pass filtered error-corrected rotational rate; and blend the high-pass filtered accelerometer-based rotational rate and the low-pass filtered error-corrected rotational rate to produce the blended rotational rate of the aircraft.

The complementary filter can be a multi-input single-output (MISO) filter that takes the aircraft angular acceleration and the first error-corrected rotational rate as inputs and produces the blended rotational rate of the aircraft as an output.

The source external to the first air data computer can include a second air data computer including a second inertial sensor assembly. The aircraft can have a first side and a second side separated by a centerline extending from a nose of the aircraft to a tail of the aircraft. The first air data computer can be disposed at the first side of the aircraft. The second air data computer can be disposed at the second side of the aircraft.

The source external to the first air data computer can include a first external source. The first air data computer can be configured to receive third attitude information of the aircraft from a second external source that is separate from both the first air data computer and the first external source. The first air data computer can be configured to determine the first attitude correction values based on the first attitude information, the second attitude information, and the third attitude information.

The first air data computer can be configured to compare the first attitude information, the second attitude information, and the third attitude information to determine a validity status of one or more of the first attitude information, the second attitude information, and the third attitude information.

An air data computer includes an inertial sensor assembly, a Kalman estimator module, and an attitude determination module. The inertial sensor assembly includes a plurality of accelerometers and a plurality of rate gyroscopes. Each of the plurality of accelerometers is configured to sense acceleration along one of a plurality of axes. Each of the plurality of rate gyroscopes is configured to sense rotational rate along one of the plurality of axes. The Kalman estimator module is configured to determine a set of attitude correction values based on attitude information of the aircraft received from a source external to the air data computer. The attitude determination module is configured to determine error-corrected attitude information using the set of attitude correction values, and to output the error-corrected attitude information.

The air data computer of the preceding paragraph can optionally include, additionally and/or alternatively, any one or more of the following features, configurations and/or additional components:

The attitude information of the aircraft received from the source external to the air data computer can include: a pitch angle of the aircraft; a roll angle of the aircraft; a covariance estimate of an error of the pitch angle of the aircraft; and a covariance estimate of an error of the roll angle of the aircraft. The Kalman estimator module can be configured to determine the set of attitude correction values based on the pitch angle of the aircraft, the roll angle of the aircraft, the covariance estimate of an error of the pitch angle of the aircraft, and the covariance estimate of an error of the roll angle of the aircraft.

The Kalman estimator module can be configured to determine a set of sensor error correction values based on the error-corrected attitude information and the attitude information of the aircraft received from the source external to the air data computer. The air data computer can further include an inertial sensor compensation and correction module and an attitude rate blending module. The inertial sensor compensation and correction module can be configured to apply the set of sensor error correction values to each of the acceleration and rotational rate sensed with the inertial sensor assembly to produce error-corrected acceleration and error-corrected rotational rate values. The attitude rate blending module can be configured to: receive acceleration information from the source external to the air data computer; determine aircraft angular acceleration based on the error-corrected acceleration and the acceleration information received from the source external to the air data computer, and blend the aircraft angular acceleration and the error-corrected rotational rate using a complementary filter to produce a blended rotational rate. The attitude determination module can be configured to determine the error-corrected attitude information of the aircraft using the set of attitude correction values and the blended rotational rate.

A method includes: sensing acceleration and rotational rate of an aircraft with an inertial sensor assembly of an air data computer; and determining first attitude of the aircraft based on the acceleration and rotational rate sensed with the inertial sensor assembly. The method further includes: receiving second attitude information of the aircraft from a source external to the air data computer; attitude correction values based on the first attitude information and the second attitude information; applying the attitude correction values to the first attitude information to produce error-corrected attitude information of the aircraft; and outputting the error-corrected attitude information from the air data computer.

The method of the preceding paragraph can optionally include, additionally and/or alternatively, any one or more of the following features, configurations, operations, and/or additional components:

Determining the first attitude information of the aircraft can include determining a first aircraft pitch angle and a first aircraft roll angle. The second attitude information can include: a second aircraft pitch angle; a second aircraft roll angle; a covariance estimate of an error of the second aircraft pitch angle; and a covariance estimate of an error of the second aircraft roll angle. Determining the attitude correction values based on the first attitude information and the second attitude information can include determining the attitude correction values via an extended Kalman filter that utilizes the first aircraft pitch angle, the first aircraft roll angle, a covariance estimate of an error of the first aircraft pitch angle, a covariance estimate of an error of the first aircraft roll angle, the second aircraft pitch angle, the second aircraft roll angle, the covariance estimate of the error of the second aircraft pitch angle, and the covariance estimate of the error of the second aircraft roll angle to produce the attitude correction values.

The method can further include: determining a set of sensor error correction values based on the first attitude information and the second attitude information; applying the set of sensor error correction values to each of the acceleration and the rotational rate sensed with the inertial sensor assembly to produce error-corrected acceleration and error-corrected rotational rate of the aircraft; and determining the first attitude information based on the error-corrected acceleration and the error-corrected rotational rate of the aircraft.

The method can further include receiving acceleration information from the source external to the air data computer. Determining the first attitude information based on the error-corrected acceleration and the error-corrected rotational rate can include: determining aircraft angular acceleration based on the error-corrected acceleration and the acceleration information received from the source external to the air data computer, blending the aircraft angular acceleration and the error-corrected rotational rate using a complementary filter to produce a blended rotational rate; and determining the error-corrected attitude information based on the blended rotational rate.

The source external to the air data computer can include a first external source. The method can further include: receiving third attitude information of the aircraft from a second external source that is separate from both the air data computer and the first external source; and comparing the first attitude information, the second attitude information, and the third attitude information to determine a validity status of one or more of the first attitude information, the second attitude information, and the third attitude information.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a first air data computer that includes a first inertial sensor assembly, the first air data computer configured to:
   sense, with the first inertial sensor assembly, acceleration and rotational rate of an aircraft;
   determine first attitude information of the aircraft based on the acceleration and rotational rate sensed with the first inertial sensor assembly;
   receive second attitude information of the aircraft from a source external to the first air data computer;
   determine first attitude correction values based on the first attitude information and the second attitude information;
   apply the first attitude correction values to the first attitude information to produce first error-corrected attitude information of the aircraft; and
   output the first error-corrected attitude information;
   wherein the first attitude information comprises:
   a first aircraft pitch angle;
   a first aircraft roll angle;
   a covariance estimate of an error of the first aircraft pitch angle; and
   a covariance estimate of an error of the first aircraft roll angle;
   wherein the second attitude information received from the source external to the first air data computer comprises:
   a second aircraft pitch angle;
   a second aircraft roll angle;
   a covariance estimate of an error of the second aircraft pitch angle; and
   a covariance estimate of an error of the second aircraft roll angle; and
   wherein the first air data computer is configured to determine the first set of error correction values based on the first aircraft pitch angle, the first aircraft roll angle, the covariance estimate of the error of the first aircraft pitch angle, the covariance estimate of the error of the first roll angle, the second aircraft pitch angle, the second aircraft roll angle, the covariance estimate of the error of the second aircraft pitch angle, and the covariance estimate of the error of the second aircraft roll angle.

2. The system of claim 1, further comprising:
   a second air data computer that includes a second inertial sensor assembly, the second air data computer configured to produce the second attitude information of the aircraft.

3. The system of claim 2,
   wherein the second air data computer is configured to:
   determine the second attitude information of the aircraft based on acceleration and rotational rate sensed by the second inertial sensor assembly;
   receive the first error-corrected attitude information from the first air data computer;
   determine second attitude correction values based on the second attitude information and the first error-corrected attitude information;
   apply the second attitude correction values to the second attitude information to produce second error-corrected attitude information of the aircraft; and
   output the second error-corrected attitude information.

4. The system of claim 1,
   wherein the first air data computer is configured to determine the first attitude correction values via an extended Kalman filter that utilizes the first aircraft pitch angle, the first aircraft roll angle, the covariance estimate of the error of the first pitch angle, the covariance estimate of the error of the first roll angle, the second aircraft pitch angle, the second aircraft roll angle, the covariance estimate of the error of the second pitch angle, and the covariance estimate of the error of the second roll angle.

5. The system of claim 1,
   wherein the first air data computer is further configured to:
   determine a set of sensor error correction values based on the first attitude information and the second attitude information;
   apply the set of sensor error correction values to each of the acceleration and the rotational rate sensed with the first inertial sensor assembly to produce error-corrected acceleration and error-corrected rotational rate of the aircraft; and
   determine the first attitude information based on the first error-corrected acceleration and the first error-corrected rotational rate.

6. The system of claim 5,
   wherein the first air data computer is configured to receive acceleration information from the source external to the first air data computer; and
   wherein the first air data computer is configured to determine the first attitude information based on the error-corrected acceleration and the error-corrected rotational rate by being configured to:

determine aircraft angular acceleration based on the error-corrected acceleration and the acceleration information received from the source external to the first air data computer;
blend the aircraft angular acceleration and the error-corrected rotational rate using a complementary filter to produce a blended rotational rate; and
determine the first error-corrected attitude information based on the blended rotational rate.

7. The system of claim 6,
wherein the complementary filter is configured to:
integrate the aircraft angular acceleration to produce an accelerometer-based rotational rate of the aircraft;
filter the accelerometer-based rotational rate to remove low frequency signal and noise to produce a high-pass filtered accelerometer-based rotational rate;
filter the error-corrected rotational rate to remove high frequency signal and noise to produce a low-pass filtered error-corrected rotational rate; and
blend the high-pass filtered accelerometer-based rotational rate and the low-pass filtered error-corrected rotational rate to produce the blended rotational rate of the aircraft.

8. The system of claim 6,
wherein the complementary filter is a multi-input single-output (MISO) filter that takes the aircraft angular acceleration and the first error-corrected rotational rate as inputs and produces the blended rotational rate of the aircraft as an output.

9. The system of claim 1,
wherein the source external to the first air data computer comprises a second air data computer including a second inertial sensor assembly;
wherein the aircraft has a first side and a second side separated by a centerline extending from a nose of the aircraft to a tail of the aircraft;
wherein the first air data computer is disposed at the first side of the aircraft; and
wherein the second air data computer is disposed at the second side of the aircraft.

10. The system of claim 1,
wherein the source external to the first air data computer comprises a first external source;
wherein the first air data computer is configured to receive third attitude information of the aircraft from a second external source that is separate from both the first air data computer and the first external source; and
wherein the first air data computer is configured to determine the first attitude correction values based on the first attitude information, the second attitude information, and the third attitude information.

11. The system of claim 10,
wherein the first air data computer is configured to compare the first attitude information, the second attitude information, and the third attitude information to determine a validity status of one or more of the first attitude information, the second attitude information, and the third attitude information.

12. A method comprising:
sensing acceleration and rotational rate of an aircraft with an inertial sensor assembly of an air data computer;
determining first attitude information of the aircraft based on the acceleration and rotational rate sensed with the inertial sensor assembly;
receiving second attitude information of the aircraft from a source external to the air data computer;
determining attitude correction values based on the first attitude information and the second attitude information;
applying the attitude correction values to the first attitude information to produce error-corrected attitude information of the aircraft; and
outputting the error-corrected attitude information from the air data computer;
wherein determining the first attitude information of the aircraft comprises determining a first aircraft pitch angle and a first aircraft roll angle;
wherein the second attitude information comprises:
a second aircraft pitch angle;
a second aircraft roll angle;
a covariance estimate of an error of the second aircraft pitch angle; and
a covariance estimate of an error of the second aircraft roll angle; and
wherein determining the attitude correction values based on the first attitude information and the second attitude information comprises determining the attitude correction values via an extended Kalman filter that utilizes the first aircraft pitch angle, the first aircraft roll angle, a covariance estimate of an error of the first aircraft pitch angle, a covariance estimate of an error of the first aircraft roll angle, the second aircraft pitch angle, the second aircraft roll angle, the covariance estimate of the error of the second aircraft pitch angle, and the covariance estimate of the error of the second aircraft roll angle to produce the attitude correction values.

13. The method of claim 12, further comprising:
determining a set of sensor error correction values based on the first attitude information and the second attitude information;
applying the set of sensor error correction values to each of the acceleration and the rotational rate sensed with the inertial sensor assembly to produce error-corrected acceleration and error-corrected rotational rate of the aircraft; and
determining the first attitude information based on the error-corrected acceleration and the error-corrected rotational rate of the aircraft.

14. The method of claim 13, further comprising:
receiving acceleration information from the source external to the air data computer;
wherein determining the first attitude information based on the error-corrected acceleration and the error-corrected rotational rate comprises:
determining aircraft angular acceleration based on the error-corrected acceleration and the acceleration information received from the source external to the air data computer;
blending the aircraft angular acceleration and the error-corrected rotational rate using a complementary filter to produce a blended rotational rate; and
determining the error-corrected attitude information based on the blended rotational rate.

15. The method of claim 12, wherein the source external to the air data computer comprises a first external source, the method further comprising:
receiving third attitude information of the aircraft from a second external source that is separate from both the air data computer and the first external source; and
comparing the first attitude information, the second attitude information, and the third attitude information to determine a validity status of one or more of the first attitude information, the second attitude information, and the third attitude information.

16. A system comprising:

a first air data computer that includes a first inertial sensor assembly, the first air data computer configured to:
- sense, with the first inertial sensor assembly, acceleration and rotational rate of an aircraft;
- receive second attitude information of the aircraft from a first external source that is external to the first air data computer;
- receive third attitude information of the aircraft from a second external source that is separate from both the first air data computer and the first external source;
- determine first attitude information of the aircraft based on the acceleration and rotational rate sensed with the first inertial sensor assembly;
- determine first attitude correction values based on the first attitude information, the second attitude information, and the third attitude information;
- apply the first attitude correction values to the first attitude information to produce first error-corrected attitude information of the aircraft; and
- output the first error-corrected attitude information.

* * * * *